(12) United States Patent
Falken

(10) Patent No.: US 12,285,892 B2
(45) Date of Patent: Apr. 29, 2025

(54) BIODEGRADABLE AND INDUSTRIALLY COMPOSTABLE INJECTION MOLDED MICROCELLULAR FLEXIBLE FOAMS, AND A METHOD OF MANUFACTURING THE SAME

(71) Applicant: O2 Partners, LLC, Amherst, MA (US)

(72) Inventor: Robert Falken, Solana Beach, CA (US)

(73) Assignee: O2 Partners, LLC, Amherst, MA (US)

( * ) Notice: Subject to any disclaimer, the term of this patent is extended or adjusted under 35 U.S.C. 154(b) by 0 days.

(21) Appl. No.: 18/495,856

(22) Filed: Oct. 27, 2023

(65) Prior Publication Data
US 2024/0058997 A1   Feb. 22, 2024

Related U.S. Application Data

(63) Continuation of application No. 18/087,934, filed on Dec. 23, 2022, now Pat. No. 11,833,724, which is a
(Continued)

(51) Int. Cl.
*B29C 44/34* (2006.01)
*A43B 13/04* (2006.01)
(Continued)

(52) U.S. Cl.
CPC .......... *B29C 44/3402* (2016.11); *A43B 13/04* (2013.01); *B29C 44/422* (2013.01);
(Continued)

(58) Field of Classification Search
CPC . B29C 44/3402; B29C 44/3403; B29C 44/10; B29C 44/105; B29C 44/422;
(Continued)

(56) References Cited

U.S. PATENT DOCUMENTS

| 4,187,621 A | 2/1980 | Cohen |
| 5,437,924 A | 8/1995 | Decker, III et al. |

(Continued)

FOREIGN PATENT DOCUMENTS

| CN | 1170662 A | 1/1998 |
| CN | 1400986 A | 3/2003 |

(Continued)

OTHER PUBLICATIONS

International Search Report and Written Opinion, dated Nov. 4, 2019, for International Patent Application No. PCT/US2019/033421.
(Continued)

*Primary Examiner* — Stella K Yi
(74) *Attorney, Agent, or Firm* — Morgan, Lewis & Bockius LLP

(57) ABSTRACT

A process for injection molded microcellular foaming various flexible foam compositions from biodegradable and industrially compostable bio-derived thermoplastic resins for use in, for example, footwear components, seating components, protective gear components, and watersport accessories wherein a process of manufacturing includes the steps of: producing a suitable thermoplastic biopolymer or biopolymer blend; injection molding the thermoplastic biopolymer or biopolymer blend into a suitable mold shape with inert nitrogen gas; controlling the polymer melt, pressure, temperature, and time such that a desirable flexible foam is formed; and utilizing gas counterpressure in the injection molding process to ensure the optimal foam structure with the least amount of cosmetic defects and little to no plastic skin on the outside of the foamed structure.

20 Claims, 3 Drawing Sheets

Related U.S. Application Data continuation of application No. 17/885,096, filed on Aug. 10, 2022, now Pat. No. 11,565,448, which is a continuation of application No. 17/174,407, filed on Feb. 12, 2021, now Pat. No. 11,413,799, which is a continuation of application No. 16/418,968, filed on May 21, 2019, now Pat. No. 11,155,009.

(60) Provisional application No. 62/674,544, filed on May 21, 2018.

(51) Int. Cl.
  B29C 44/42 (2006.01)
  B29C 45/00 (2006.01)
  B29C 45/12 (2006.01)
  B29C 45/17 (2006.01)
  B29C 45/26 (2006.01)
  B29C 45/78 (2006.01)

(52) U.S. Cl.
  CPC ...... B29C 45/0001 (2013.01); B29C 45/0046 (2013.01); B29C 45/12 (2013.01); B29C 45/1781 (2013.01); B29C 45/2642 (2013.01); B29C 45/78 (2013.01); *B29C 2045/1787* (2013.01); *B29C 2791/002* (2013.01); *B29C 2791/006* (2013.01); *B29C 2791/007* (2013.01); *B29C 2945/76006* (2013.01); *B29C 2945/7604* (2013.01)

(58) Field of Classification Search
  CPC . B29C 45/0001; B29C 45/0046; B29C 45/12; B29C 45/1781; B29C 45/2642; B29C 45/78; A43B 13/04
  See application file for complete search history.

(56) References Cited

U.S. PATENT DOCUMENTS

| | | | |
|---|---|---|---|
| 5,494,723 | A | 2/1996 | Erren et al. |
| 5,925,386 | A | 7/1999 | Moberg |
| 5,997,781 | A | 12/1999 | Nishikawa et al. |
| 6,322,347 | B1 | 11/2001 | Xu |
| 8,362,157 | B2 | 1/2013 | Wakaki et al. |
| 8,937,135 | B2 | 1/2015 | Steinke et al. |
| 9,610,746 | B2 | 4/2017 | Wardlaw et al. |
| 10,316,139 | B2 | 6/2019 | Bastioli et al. |
| 10,645,992 | B2 | 5/2020 | Le et al. |
| 10,759,096 | B2 | 9/2020 | Smith et al. |
| 10,843,429 | B2 | 11/2020 | Falken |
| 10,913,189 | B2 | 2/2021 | Chen |
| 11,155,009 | B2 | 10/2021 | Falken |
| 11,413,799 | B2 | 8/2022 | Falken |
| 11,465,377 | B2 | 10/2022 | Falken |
| 11,565,448 | B2 | 1/2023 | Falken |
| 11,833,724 | B2 | 12/2023 | Falken |
| 2002/0002208 | A1 | 1/2002 | Martel et al. |
| 2003/0116876 | A1 | 6/2003 | Wobbe |
| 2004/0112996 | A1 | 6/2004 | Villwock et al. |
| 2005/0127579 | A1 | 6/2005 | Suzuki |
| 2007/0108663 | A1 | 5/2007 | Yusa et al. |
| 2007/0190310 | A1 | 8/2007 | Yusa et al. |
| 2008/0050576 | A1 | 2/2008 | Pierick et al. |
| 2008/0127527 | A1 | 6/2008 | Chen |
| 2009/0270530 | A1 | 10/2009 | Nakai et al. |
| 2010/0047550 | A1 | 2/2010 | Prissok et al. |
| 2010/0198133 | A1* | 8/2010 | Dougherty, Jr. .... A61F 13/2082 428/338 |
| 2010/0230405 | A1 | 9/2010 | Strait, III |
| 2010/0242312 | A1 | 9/2010 | Lim et al. |
| 2011/0178196 | A1 | 7/2011 | Steinke et al. |
| 2012/0052143 | A1 | 3/2012 | Chen et al. |
| 2012/0225961 | A1 | 9/2012 | Van Horn et al. |
| 2013/0154143 | A1 | 6/2013 | Wallinger et al. |
| 2013/0156833 | A1 | 6/2013 | Malet |
| 2013/0203877 | A1 | 8/2013 | Uchiyama et al. |
| 2013/0303645 | A1 | 11/2013 | Dix et al. |
| 2015/0102528 | A1 | 4/2015 | Gunes |
| 2016/0227876 | A1 | 8/2016 | Le et al. |
| 2017/0100861 | A1 | 4/2017 | Pawloski et al. |
| 2017/0253710 | A1 | 9/2017 | Smith et al. |
| 2018/0236086 | A1 | 8/2018 | Garcia Gonzalez et al. |
| 2018/0237605 | A1 | 8/2018 | Chang et al. |
| 2018/0362721 | A1 | 12/2018 | Chang et al. |
| 2018/0368515 | A1 | 12/2018 | Yamade et al. |
| 2019/0090581 | A1 | 3/2019 | Holmes et al. |
| 2019/0211203 | A1 | 7/2019 | Grechi |
| 2019/0351592 | A1 | 11/2019 | Falken |
| 2020/0079899 | A1 | 3/2020 | Bastioli et al. |
| 2020/0094452 | A1 | 3/2020 | Baghdadi et al. |
| 2020/0269535 | A1 | 8/2020 | Falken |
| 2020/0385573 | A1 | 12/2020 | Jiang |
| 2021/0039346 | A1 | 2/2021 | Falken |
| 2021/0229326 | A1 | 7/2021 | Falken |
| 2021/0229385 | A1 | 7/2021 | Falken |
| 2022/0379528 | A1 | 12/2022 | Falken |
| 2023/0038799 | A1 | 2/2023 | Falken |
| 2023/0127747 | A1 | 4/2023 | Falken |

FOREIGN PATENT DOCUMENTS

| | | |
|---|---|---|
| CN | 102108116 A | 6/2011 |
| CN | 102229707 A | 11/2011 |
| CN | 102165013 B | 4/2013 |
| CN | 203937090 U | 11/2014 |
| CN | 107980048 A | 5/2017 |
| CN | 206678277 U | 11/2017 |
| EP | 0952908 A2 | 11/1999 |
| EP | 1266928 A1 | 12/2002 |
| EP | 1975156 A1 | 10/2008 |
| EP | 2514578 A1 | 10/2012 |
| GB | 2358121 A | 7/2001 |
| JP | 2739775 B2 | 4/1998 |
| JP | 2001112501 A | 4/2001 |
| JP | 2002201301 A1 | 7/2002 |
| JP | 2002-363326 A | 12/2002 |
| JP | 2010-519372 A | 6/2010 |
| JP | 2011042793 A | 3/2011 |
| JP | 2011-168755 A | 9/2011 |
| JP | 2012-229416 A | 11/2012 |
| JP | 2013-527291 A | 6/2013 |
| JP | 6373891 B2 | 8/2018 |
| JP | 2019-058661 A | 4/2019 |
| TW | 221469 B | 3/1994 |
| TW | 201109148 A | 3/2011 |
| WO | 9217533 A1 | 10/1992 |
| WO | 2007/060828 A1 | 5/2007 |
| WO | 2018/224461 A1 | 12/2018 |

OTHER PUBLICATIONS

International Search Report and Written Opinion, dated Jun. 26, 2020, for International Patent Application No. PCT/ US2020/033477.

Office Action dated Apr. 21, 2021 for Taiwanese Patent Application No. 109117635.

Office Action dated Dec. 24, 2020 for Taiwanese Patent Application No. 109117635.

Extended European Search Report dated Jan. 24, 2022 for European Patent Application No. 19807932.9.

International Search Report and Written Opinion dated Mar. 24, 2022 for International Patent Application No. PCT/US2021/059491.

First Office Action dated Feb. 22, 2022 for Chinese Application No. 201980048784.6.

"Sustainability Report 2019, Consolidated Voluntary Non-Financial Statement Pursuant to Legislative Decree 254/2016," Novamont, retrieved from Internet <https://www.novamont.com/public/Bilancio%20di%20sostenibilit%C3%A0/bds2019_ENG_web_ver2.pdf>.

(56) References Cited

OTHER PUBLICATIONS

Ogunsona, Emmanuel et al. "Characterization and mechanical properties of foamed poly(ε-caprolactone) and Mater-Bi blends using CO2 as blowing agent," Journal of Cellular Plastics, published Jul. 22, 2014.

Najafi, Naqi et al. "Rheological and foaming behavior of linear and branched polylactides," Rheol Acta (2014) 53:779-790.

Lauzon, Michael. "Novamont boosts bio content in polymer," Plastic News, dated Jun. 19, 2013, retrieved from Internet <https://www.plasticsnews.com/article/20130619/NEWS/130619916/novamont-boosts-bio-content-in-polymer>.

Barrett, Axel. "Mater-Bi® Biopolymers," Bioplastics News, dated Dec. 30, 2013, retrieved from Internet <https://bioplasticsnews.com/2013/12/30/mater-bi-biopolymers/>.

Dippold, Marcel et al. "Influence of pressure-induced temperature drop on the foaming behavior of amorphous polylactide (PLA) during autoclave foaming with supercritical CO2," The Journal of Supercritical Fluids, 190 (2022) 105734.

Decision on Rejection for related Japanese Patent Application No. 2021-516533 dated Jul. 7, 2023 (with translation).

Office Action, dated Aug. 22, 2022, for Brazilian Patent Application No. BR112020023590-3.

Office Action, dated Oct. 30, 2023, for Brazilian Patent Application No. BR112020023590-3.

Office Action, dated Oct. 31, 2023, for Brazilian Patent Application No. BR122022024286-3.

Office Action, dated Jul. 19, 2024, for Brazilian Patent Application No. BR122022024286-3.

Office Action, dated Jul. 5, 2024, for Japanese Patent Application No. 2023-189940.

Office Action, dated Feb. 6, 2024, for Australian Patent Application No. 2019272664.

Notice of Acceptance, dated Jul. 11, 2024, for Australian Patent Application No. 2019272664.

\* cited by examiner

BIODEGRADABLE AND INDUSTRIALLY COMPOSTABLE INJECTION MOLDED MICROCELLULAR FLEXIBLE FOAMS, AND A METHOD OF MANUFACTURING THE SAME

CROSS-REFERENCE TO RELATED APPLICATIONS

This application is a continuation of U.S. patent application Ser. No. 18/087,934, filed on Dec. 23, 2022, which is a continuation of U.S. patent application Ser. No. 17/885,096, filed on Aug. 10, 2022, now U.S. Pat. No. 11,565,448, which is a continuation of U.S. patent application Ser. No. 17/174,407, filed on Feb. 12, 2021, now U.S. Pat. No. 11,413,799, which is a continuation of U.S. patent application Ser. No. 16/418,968, titled "BIODEGRADABLE AND INDUSTRIALLY COMPOSTABLE INJECTION MOULDED MICROCELLULAR FLEXIBLE FOAMS, AND A METHOD OF MANUFACTURING THE SAME," filed on May 21, 2019, now U.S. Pat. No. 11,155,009, which claims priority to and the benefit of U.S. Provisional Patent Application No. 62/674,544, titled "BIODEGRADABLE AND INDUSTRIALLY COMPOSTABLE INJECTION MOULDED MICROCELLULAR FLEXIBLE FOAMS, AND A METHOD OF MANUFACTURING THE SAME," filed on May 21, 2018, each of which are incorporated herein by reference in its entirety for all purposes.

BACKGROUND

The present invention relates to a process for injection molded microcellular foaming various flexible foam compositions from biodegradable and industrially compostable bio-derived thermoplastic resins for use in, for example, footwear components, seating components, protective gear components, and watersport accessories.

Degradation through composting is an important process for renewing resources used in producing manufactured goods. However, when those manufactured goods involve foam, decomposition is problematic. Particularly, there are several disadvantages of conventionally known methods of flexible foam manufacturing. For instance, such disadvantages include the selection and use of non-renewable polymers, chemical blowing agents, and chemical additives, which as employed in the foam manufacturing industry and the processing procedures inherent thereto, do not typically biodegrade, and that are generally considered bad for the environment. This lack of biodegradation means that many conventional flexible foam materials and the products with which they are contained, end up in landfills for anywhere from decades to centuries.

This is also problematic because the overuse of landfills in the world today has a direct negative impact on both the environment and the economy. For example, landfills are the third largest source of methane emissions in the United States. Further, the aforementioned non-biodegradable polymers and chemicals used in convention flexible foams are particularly derived from non-renewable resources. These materials are not naturally renewable, as is the case with bio-derived feedstocks, and therefore, their very creation is a net loss for the environment as their materials are often taken, used, and then discarded non-sustainably. Furthermore, even if renewable polymers were selected for use in conventionally known method of flexible foam manufacturing, the chemical blowing agents and crosslinking of those methods would likely contaminate the renewable polymer with additives that do not biodegrade or compost. Thus, making it a zero-sum gain. Further still, the crosslinking of the biopolymer would also likely prevent any suitable end-of-life solution for biodegrading or composting as the precursor components could not be separated thereby resulting in more waste generation and more material going to landfill.

Accordingly, although composting is an important process in providing for a renewable and sustainable future, its integration in the manufacturing industry is very limited. However, it would be very useful, e.g., to the environment, if manufactured materials could be made compostable. For instance, the composting and biodegradation of flexible foam materials creates an opportunity of waste disposal that represents a net-benefit to the environment and the economy. For example, by composting these materials, it would make it possible to reduce the overall amount of waste being sent to landfills and mass-burn incinerators.

In addition to reducing waste, the process of composting would also create a usable product that is nutrient-rich and could be used to amend poor soils to grow food or to fertilize gardens. Accordingly, the very notion of composting and biodegrading flexible foams, however novel, can revolutionize the entire value chain while keeping to the principals of the so-called circular economy. There are two typical forms of composting: industrial composting and home composting. Both of these composing methodologies have benefits and drawbacks.

Industrial composting is a form of large-scale composting that is designed to handle a very high volume of organic waste. It is conducted in large-scale facilities at temperatures between 50° to 60° C. Home composting is a form of composting that handles organic waste from one household. Particularly, home composting refers to composting at relatively lower temperatures, like those found in a backyard compost heap at home, hence the title "home". In contrast to industrial composting, home composting involves a cooler aerobic breakdown of organic material or waste such as yard trimmings, kitchen scraps, wood shavings, cardboard, and paper. The volumes treated in home composting are considerably smaller than in industrial composting and the compost is usually used in private gardens. This process is typically conducted in small-scale composters and heaps. In this method, temperatures are typically in the psychrophilic (0-20° C.) to mesophilic (20-45° C.) ranges (as explained below). Accordingly, different technologies exist, but the general processing is the same: a controlled process of active composting followed by curing.

The active composting phase typically lasts at least 21 days. Under these conditions, microorganisms grow on organic waste, breaking it down to $CO_2$ and water, using it as a nutrient. During composting, organic waste is amassed in piles and, as a result, part of the energy of composting is released as heat. When the temperature of the composting pile increases the microbial populations shift: microbes adapted to ambient temperature, e.g., mesophiles, stop their activity, die-off, and are replaced by microbes adapted to live at high temperature, e.g., thermophiles. For hygienisation purposes, for home composting, temperatures should be maintained above 60° C. for at least a week, in order to eliminate pathogenic microorganisms. By contrast, the curing phase of industrial composting slows the rate of decomposition to a consistent pace, and the compost matures at temperatures in the lower mesophilic range of below 40° C.

A primary problem with industrial composting is that the input feedstocks should be disposed appropriately in order to be effectively processed. That is, the logistical challenges are a hurdle in that proper collecting, sorting, and transporting to an industrial composting facility is required. The combined composting and recycling diversion rate of the United States is around 35%, which indicates that society has a long way to go before the vast majority of infrastructure is "closing the loop" on waste diversion. One method of overcoming this shortfall is to better educate the end-user and to establish a localized network of take-back schemes that feed into larger take-back schemes. The goal being to develop enough of a convenience and accessibility that industrial composting becomes normalized and ever-present in daily life.

Likewise, a prevalent disadvantage in home composting is the amount of effort involved. All of the required compost-feedstock materials need to be carried and/or transferred to the compost pile. Once the compost heap is large enough to begin generating energy, and thereby heat, it needs to be turned to make the decomposition faster and more thorough, which can be strenuous work. When the organic matter is sufficiently decomposed, the home compost must be hauled away for use in soil amendment. Another drawback of home composting is the limited quantity of useable compost that the average person can generate in a home-setting. The limited amount of generated compost potentially gives way to limited use, and thus, the motivation of the average person to commit to the effort of home composting can be low.

Because of these drawbacks, traditionally, the manufacturing industry has avoided the use of raw materials and precursor ingredients with the potential to biodegrade or compost. Additionally, this has traditionally been avoided because the required technical performance properties of these materials were often inferior to that of the conventional non-biodegradable and non-compostable variety. For instance, a limiting factor of some, but not all, compostable precursor ingredients can be the tendency for these ingredients to break-down and/or degrade before the end of the product's useable life. An example of this would be an ultra-violet sensitive product whereby the biodegradable and compostable precursor might be attacked and weakened by repeated sunlight exposure which might eventually lead to the products failure well before the end-user was ready to dispose of the product.

Additionally, a current concern for modern manufacturing is being net-neutral with respect to emissions and waste, sustainable with respect to materials being used in the manufacturing process, and renewable with respect to the end of life of the product and its materials. So being, net-neutrality, such as with respect to $CO_2$ emission, in addition to compostability of the end product has become important in choosing the appropriate materials for use in manufacturing of consumer goods products.

Consequently, it is a key driver for the present manufacturing processes disclosed herein, as compared to the more traditional manufacturing processes currently present, is that manufacturers produce environmentally-thoughtful end products, and so being, it is useful to carefully consider the materials used in the manufacture said end products, and to balance that against the intended useable-life of the product. An example of challenging products during the production of which these concerns should be, but are not, addressed are standard manufactured products employing foam, such as in the production of cushioning, such as for furniture, and/or foam products, such as for the manufacture of running shoes.

For instance, running shoes are a highly technical product that are exposed to repeated abuses, such as: impact, abrasion, and all manner of environmental exposures over considerable amounts of time; perhaps 1-3 years depending on the frequency of use. When considering sustainable materials for the use in manufacturing cushioning for furniture or for soles, mid-soles, and/or cushioning for insoles of running shoes, it is important take the above requirements into account. A material that cannot handle repeated abuse before failure would not produce a satisfactory pair of running shoes. Additionally, any material that has the potential to break-down or weaken to the point of failure during regular product use, prior to the intended end-of-life, would not be acceptable.

In order to solve this problem, one must seek-out specialized materials with the right balance of technical performance properties, and sustainability aspects, such as compostability with a managed end-of-life solution, that is net-neutral (or negative) with respect to harmful emission. Particularly, since furniture cushioning is bulky and running shoes are a demanding product, home composting materials would not be a suitable solution for use in their making as the lower break-down temperatures would translate to furniture or a running shoe that would be prone to falling apart long before its intended end-of-life. In this example, materials that industrial compost are a much better option as they can handle higher temperature challenges and offer greater technical performance properties near equal to or equal to their non-industrially compostable and non-biodegradable counterparts. Essentially, furniture or a pair of running shoes manufactured with industrially compostable materials would function very well for the useable life of the product, and only at the end of the products useable life would the materials have the option to be directed into industrial compost settings for "closed loop" waste diversion.

Accordingly, where possible, in order to reduce the destructive footprint often attendant to the manufacturing process, the materials and processes of manufacturing should be formulated in such a manner that allows for ready composting after the end of the life of the product. However, as indicated above, this is difficult because there are very limited biodegradable and compostable precursors commercially available. Those that do exist are not necessarily designed and capable of solving all of the combined challenges of performance and long-term usability while readily composting and biodegrading in a controlled setting at the end of their useable life. Those precursors that solve some of the aforementioned challenges, fail to solve others and this leads to the potential of consternation in the consumer and likely bad reviews of the products with which they are contained. Despite these significant drawbacks, materials that can compost either at an industrial facility or at home would theoretically be useful starting products in renewable, sustainable, and green manufacturing.

Another aspect of present manufacturing processes is with respect to the production of flexible foams. Flexible foams are a type of object formed by trapping pockets of gas in a liquid or solid whereby the resulting foam is said to be flexible due in part to its malleability. Flexible foams are typically used in cushioning applications, such as footwear, furniture, bedding, and other sporting goods. Flexible foams typically fall into two categories: closed-cell flexible thermoplastic polymer foams and open-cell flexible polyurethane foams. Each of these foam types have very different manufacturing methods.

Closed-cell flexible thermoplastic polymer foams are commonly produced in a dry process in which a suitable man-made polymer is selected and blended with various chemical additives, crosslinking agent, and chemical blowing agent for producing a "dough," which dough is then kneaded and extruded into flat sheets. The sheets are then stacked on top of each other and placed in a heated press under controlled pressure. This mixture of materials and the chemical blowing agent react and expand inside of the heated press cavity. The result is a closed-cell flexible foam "bun" or "block" that is then slices to thickness. By contrast, open-cell flexible polyurethane foams are commonly produced in a liquid pouring process or liquid molding process in which a man-made polyol chemical, isocyanate chemical, and other chemical additives, are reacted together while being poured or injected into a molded shape, such as a "bun" or "block". The result is an open-cell flexible foam that is then sliced to thickness.

Consistent with the above, one of the problems with the presently available flexible foams in the market today is that they almost exclusively use non-renewable materials, and harmful chemicals in their manufacture. Furthermore, due in part to the chemical-crosslinking that takes place in the above described methods of manufacturing the conventional flexible foams, the physical structure of those flexible foams cannot be composted, biodegraded, or recycled. This is due in large part to the chemical compositions of their design and their inability to be separated back into their root precursor constituents. That is, at the end of the conventional flexible foams life it has no further use and cannot be reprocessed into new material successfully in any known commercially viable methods.

Accordingly, in view of the above, presented herein are flexible foams and manufacturing processes that may be employed to produce end products that are renewable, sustainable, and/or environmentally accountable, which materials and end products are capable of both sustained use, without breakdown, but rapidly degrade and compost after end of life. The details of one or more embodiments are set forth in the accompanying description below and with respect to the presented figures and their features. Other features and advantages will be apparent both from the description, figures, and from the claims.

SUMMARY

This document presents a process for modified injection mold microcellular foaming various flexible foam compositions from biodegradable and industrially compostable thermoplastic resins. Presently, almost all known flexible foams in the world are derived from non-renewable feedstocks, and most, if not all, do not biodegrade or industrially compost. It is an object of this invention to produce flexible foams that cause the least amount of environmental harm, but that also boast significant technical performance properties equal or greater than that of conventional non-biodegradable petrochemical flexible foams. By selecting plant-derived feedstocks for producing biopolymers, this invention contributes to sequestering greenhouse gases from the atmosphere, greatly reduces dependence on non-renewable petroleum oil, and significantly reduces non-biodegradable waste that ends up in landfills every year.

In various embodiments, the flexible foams produced hereby may be configured to industrially compost, rather than home compost, though it is conceivable that home composting may be of use in some instances, depending on the market. In various instances, industrial composting is useful because it ensures that the flexible foam will last the usable life of the resulting product it is functionalized into and not breakdown or fall apart mid-use within the finished goods. For example, it would be detrimental for a person to purchase a pair of shoes that were made from the flexible foam of this invention only to have the foam degrade during regular use before the end of the shoe's usable life.

Accordingly, in one aspect, a process of manufacturing biodegradable and industrially compostable flexible foams, whether open-cell or closed-cell, may be provided herein and may include one or more of the following steps of: Producing a thermoplastic biopolymer blended masterbatch for foaming; injection molding the thermoplastic biopolymer blend into a suitable mold shape with inert nitrogen gas; using dynamic mold temperature control to ensure the optimal cell structure; controlling the biopolymer melt, pressure, and time such that a desirable flexible foam is formed; and utilizing gas counterpressure in the injection molding process to ensure the optimal foam structure with the least amount of cosmetic defects and little to no plastic skin on the outside of the foamed part.

The manufacturing process of this disclosure, in concert with carefully selected bio-derived and renewable feedstocks, opens the door to an environmentally friendly, closed-loop process. This closed-loop process begins with proper material selection. For example, the selection of an inert and rapidly renewable polymer feedstock that is third-party certified compostable ensures that the principals of the Circular Economy are strived to be adhered to. For these purposes, the selected rapidly renewable polymer feedstocks begin their life as a form of renewable plant or mineral matter. Once converted into a suitable polymer, these environmentally accountable precursors may be combined with other environmentally accountable precursors and ingredients, for functionalizing into a custom-made bio-polymer compound that may be employed in the disclosed manufacturing processes.

Particularly, once the suitable bio-polymer compound is created, it is processed in the chemical-free manufacturing method of this disclosure. The resulting flexible foams are non-crosslinked and, in many instances, are biodegradable and compostable, e.g., entirely. Consequently, at the end of their usable life, these produced foams may be carefully ground up into small pieces and industrially composted in qualified facilities for breaking down, e.g., 100%, of their composition back into useable biomass. This useable biomass can then be used to grow more inert and rapidly renewable polymer feedstock material, and the process continues in an endless loop. Accordingly, this document describes a biodegradable and industrially compostable microcellular flexible foam and method of manufacturing the same. The foam may be a closed-cell foam but can also potentially be formed as an open-cell foam.

In various implementations, a biodegradable and industrially compostable flexible foam can be made to have identical properties and characteristics of conventional petrochemical ethylene vinyl acetate (EVA) foam or the like, and yet contain a high percentage of biomass-carbon content. For instance, flexible EVA foam is a ubiquitous material used in industry today. What makes EVA foam so prevalent is its relatively low cost and ease of processing while maintaining generally acceptable technical performance properties for a given product. The downsides of EVA foam use are many. The material is commonly derived from non-renewable feed stocks, and it is chemically crosslinked with chemical blowing agents for producing a flexible foam that is not readily biodegradable, compostable, or recyclable.

One factor that makes the advancements presented herein so useful is that the generated foams and manufactured products produced thereby is that functionally they perform in a manner similar to EVA, and so being their technical performance properties are analogous to that of EVA without the chemical additives and crosslinking. The result is a commercially acceptable flexible foam that can be a drop-in replacement for ubiquitous EVA, but that offers a vastly reduced environmental impact and managed end-of-life solution that is environmentally accountable.

Accordingly, in one aspect a method for manufacturing a biodegradable and industrially compostable flexible foam molded product is provided. In various instances, the method may include one or more of the following steps. For instance, the method may include introducing a thermoplastic biopolymer blended masterbatch for foaming into a barrel of a molding apparatus. The method may additionally include introducing a fluid into the barrel under temperature and pressure conditions to produce a super critical fluid, which upon contact with the thermoplastic biopolymer blended masterbatch produces a thermoplastic foamed melt. Further, the method may include injecting the thermoplastic foamed melt into a cavity of a suitable mold shape, and applying a gas counterpressure to the cavity. Finally, the cavity can be cooled to produce the molded product.

In various instances, the introducing of one or more of the thermoplastic biopolymer masterbatch is via a sprue bushing, such as where the thermoplastic biopolymer blended masterbatch is produced via a twin screw extruder. In one embodiment, the thermoplastic biopolymer blended masterbatch includes one or more of polylactide acid ("PLA"), polyhydroxyalkanoate ("PHA"), cellulose acetate ("CA"), starch, and a petroleum-derived thermoplastic. In various instances, the fluid is introduced into the barrel via a metering unit. In particular instances, the supercritical fluid includes one or more of nitrogen and carbon dioxide. The supercritical fluid may be introduced under pressure and at a temperature, such as where the pressure ranges from about 150 bar to about 300 bar, and the temperature ranges from about 150° C. and about 350° C. Likewise, the gas counterpressure ranges from about 5 bar to about 50 bar applied for a length of time between 1 second to 25 seconds. In certain instances, the temperature may controlled via dynamic mold temperature control.

Additionally, in another aspect, an injection molding apparatus for producing a biodegradable and industrially compostable flexible foam molded product is provided. In various instances, the injection molding apparatus may include one or more of the following. A hopper may be included, such as where the hopper is configured for receiving and introducing a plurality of thermoplastic biopolymers into the molding apparatus, such as where the thermoplastic biopolymers form a masterbatch to be blended. A metering unit may be included, such as where the metering unit is configured for receiving a fluid, and introducing the received fluid into the molding apparatus under conditions so as to produce a supercritical fluid upon said introduction. The molding apparatus may include a barrel having a first cavity configured for receiving the blended thermoplastic biopolymer masterbatch and the fluid, such that when they are introduced into the barrel a thermoplastic foamed melt is produced when the supercritical fluid contacts the blended thermoplastic biopolymer masterbatch within the cavity of the barrel. A gas counterpressure delivery unit may also be included wherein the gas counterpressure ("GCP") is configured for delivering a gas counter pressure to the first cavity so as to control expansion of the foamed melt. Also, a mold having a cavity in fluid communication with the cavity of the barrel may also be included, where the cavity of the mold is configured for receiving the foamed melt and producing the flexible foam molded product when the melt is cooled.

In various embodiments, the injection molding apparatus may include a reciprocating screw that is configured to compress the foamed melt within the cavity of the barrel, and to convey the compressed foamed melt into the cavity of the mold. Hence a conduit between the cavity of the barrel and the cavity of the mold may be present where the conduit includes a nozzle having a sprue bushing so as to form a seal between the barrel and the mold.

Accordingly, the injection molding apparatus may include one or more of the following: a hopper into which a thermoplastic material is supplied to molders in the form of small pellets. The hopper on the injection molding machine holds these pellets. The pellets may be gravity-fed from the hopper through the hopper throat into the barrel and screw assembly. A barrel may also be included where the barrel of the injection molding machine supports the reciprocating plasticizing screw, and may be heated by electric heater bands. A reciprocating screw may also be present where the reciprocating screw is used to compress, melt, and convey the material. The reciprocating screw may include three zones: the feeding zone, the compressing (or transition) zone, and the metering zone. A nozzle may also be present, where the nozzle connects the barrel to the sprue bushing of the mold and forms a seal between the barrel and the mold. The temperature of the nozzle may be set to the material's melt temperature or just below it. When the barrel is in its full forward processing position, the radius of the nozzle may nest and seal in the concave radius in the sprue bushing with a locating ring. During purging of the barrel, the barrel may backs out from the sprue, so the purging compound can free fall from the nozzle.

Additionally, a mold and hydraulic system may also be provided. The mold system may include tie bars, stationary and moving platens, as well as molding plates (bases) that house the cavity, sprue and runner systems, ejector pins, heating and cooling channels, and temperature sensor and pressure sensor. The mold is essentially a heat exchanger in which the molten thermoplastic solidifies to the desired shape and dimensional details defined by the cavity. A hydraulic system may also be present on the injection molding machine so as to provide the power to open and close the mold, build and hold the clamping tonnage, turn the reciprocating screw, drive the reciprocating screw, and energize ejector pins and moving mold cores. A number of hydraulic components are required to provide this power, which include pumps, valves, hydraulic motors, hydraulic fittings, hydraulic tubing, and hydraulic reservoirs.

A control system may also be provided. The control system may be configured to provide consistency and repeatability in machine operation. It monitors and controls the processing parameters, including the temperature, pressure, supercritical fluid ("SCF") dosing, injection speed, screw speed and position, and hydraulic position. The process control may have a direct impact on the final part quality and the economics of the process. Process control systems can range from a simple relay on/off control to an extremely sophisticated microprocessor-based, closed-loop control.

A clamping system may also be provided. The clamping system may be configured to open and close the mold, supports and carry the constituent parts of the mold, and generates sufficient force to prevent the mold from opening. Clamping force can be generated by a mechanical (toggle) lock, hydraulic lock, or a combination of the two basic types.

A delivery system may also be provided. The delivery system, which provides passage for the molten plastic from the machine nozzle to the part cavity, generally includes: a sprue, cold slug wells, a main runner, branch runners, gates, and the like.

Accordingly, in a further aspect, a system for producing a biodegradable and industrially compostable flexible foam molded product is provided. The system may include an injection molding apparatus for producing the biodegradable and industrially compostable flexible foam molded product as described above. The system may additionally include, a supercritical gas dosing system configured for receiving a fluid and introducing the received fluid into the first cavity of the barrel under conditions so as to produce a supercritical fluid upon said introduction, the supercritical fluid producing the famed melt when the supercritical fluid contacts the blended thermoplastic biopolymer masterbatch within the first cavity. The system may further include a dynamic temperature control system configured for controlling the temperature within one or more of the first and second cavities. A gas counterpressure delivery unit configured for delivering a gas counter pressure to the first cavity so as to control expansion of the foamed melt may also be included. Additionally, a control unit having one or more microprocessors may be included where the control unit is configured for controlling one or more of the injection molding apparatus, the supercritical gas dosing system, the dynamic temperature control system, and the gas counter pressure delivery unit, in accordance with one or more system parameters.

Particularly, the system components may include an injection molding machine system that includes a collection of components set forth above that work together for successfully molding parts. Those parts are the hopper, the barrel, the reciprocating screw, the nozzle, the mold system, the hydraulic system, the control system, the clamping system, and the delivery system. An SCF gas dosing system may be included and include a tank of inert gas, such as nitrogen, an air compressor, an SCF metering and control device, SCF injector, and specially design reciprocating screw, and both front and back non-return valves. A dynamic temperature control system may also be provided and include a heating unit, a cooling unit, a sequential valve, and computer-control. Additionally, there are heating elements and cooling channels located within the body of a mold, which are fed by the dynamic temperature control system, through which a heating medium or cooling medium circulates. Their function is the regulation of temperature on the mold surface. And a gas counterpressure system may be provided where it includes a tank of gas, e.g., inert gas, such as nitrogen, an air compressor, a gas pump, a gas relief valve, a gas pressure sensor, and computer-control.

The system and/or any sub-systems thereof may include one or more sensors, such as including a temperature, pressure, accelerometer, gyroscope, and an orientation sensor, such as where the one or more sensors are configured for being positioned in communication with one or more of the other components of the injection molding device, such as within one or more cavities of the injection molding apparatus. In various embodiments the sensors may be smart sensors and include a communications module, such as with a network connection, so as to perform wireless communications. Accordingly, the system, and/or any of its various parts may include a communications module that may be coupled to one or more of the control module, the supercritical gas dosing system, the dynamic control temperature system, and the gas counterpressure control unit, such as where the communications module is configured for performing one or more wireless communications protocols including WIFI, Bluetooth, Low Energy Blue Tooth, and 3G, 4G, and 5G cellular communications.

The details of one or more embodiments are set forth in the accompanying description below. Other features and advantages will be apparent from the description and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
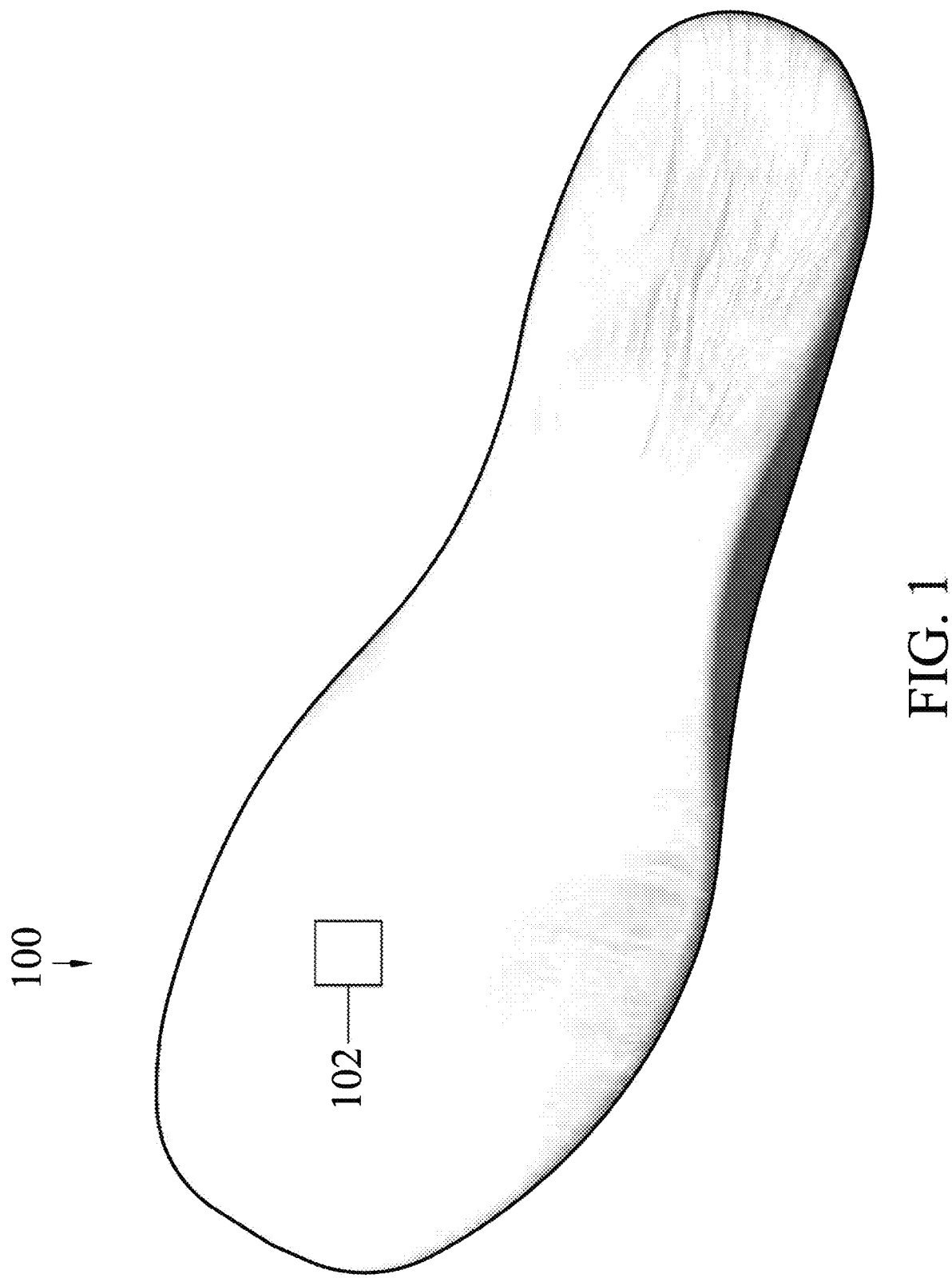
FIG. 1 shows a foamed footwear component, namely a shoe midsole according to an implementation of the present disclosure.

This document describes a biodegradable and industrially compostable microcellular flexible foam and method of manufacturing the same. The foam is preferably a closed-cell foam but can also potentially be formed as an open-cell foam. In various implementations, a biodegradable and industrially compostable flexible foam can be made to have identical properties and characteristics of conventional petrochemical ethylene vinyl acetate (EVA) foam or the like, and yet contain a high percentage of biomass-carbon content.

The present disclosure relates to a process for producing a biodegradable and industrially compostable microcellular flexible foam and method of manufacturing the same. As discussed above, foaming describes a process that involves the trapping of pockets of gas in a liquid or solid. Generally, industry uses foaming to produce light-weight polymeric materials. This is an advantageous solution for many types of products as the foamed materials impart a multitude of added values such as soft cushioning, comfort, and impact protection, among others.

In various instances, it is useful for the foaming material to be in a microcellular foam. Microcellular foam is a form of manufactured plastic, specially fabricated to contain many, many, e.g., billions, of tiny bubbles, which may be less than about 50 microns in size. This type of foam is formed by dissolving gas under high pressure into various types of polymers to cause the uniform arrangement of the gas bubbles, regularly referred to as nucleation. The primary driver for controlling and adjusting the density of microcellular foams is the gas used to create them. Depending on the gas used, the density of the foam can be anywhere between about 5% to about 99% of the pre-processed bioplastic.

Accordingly, in various instances, it is useful for the foam to be a closed-cell foam. Closed-cell foam is generally known as a cell that is totally enclosed by its walls and therefore not interconnecting with other cells. This type of material is useful as it effectively reduces liquid and gas flow from flowing through the cells. Closed cell foam, such as produced in accordance with the methods disclosed herein, is useful for industries in which liquid resistance is critical, such as cushioning, footwear, marine, HVAC, and automotive uses.

However, in various instances, it may be useful for the foam to be an open-cell foam. Open-cell foam is usually classified as "open cell" when more than half of its cells are open and interconnecting with other cells. This type of foam, which may be produced and employed in the methods disclosed herein, may be useful in that it operates more like a spring than closed-cell foam, easily returning to its original state after compression. The "springiness" is caused by the unrestricted air movement and chemical makeup.

In particular instances, the foam generated and products produced therefrom, in accordance with the described methods, functions in a manner similarly to flexible ethylene vinyl acetate (EVA) foam. Particularly, flexible EVA foam is a ubiquitous material used in the manufacturing industry today. What makes EVA foam so prevalent is its relatively low cost and ease of processing while maintaining generally acceptable technical performance properties for a given product. Consequently, the foams produced in the manner herein disclosed, may be produced at relatively low cost, with an ease of manufacturing, while maintaining not only acceptable, but often times superior technical performance products, while at the same time as being environmentally friendly.

More particularly, as indicated above, the downsides of EVA foam use are many. The material is derived from non-renewable feedstocks and is chemically crosslinked with chemical blowing agents that are not readily biodegradable, compostable, or recyclable. However, unlike flexible EVA foams, the biodegradable and industrially compostable flexible foams of the present disclosure do not contain chemicals or crosslinking agents, and they are readily biodegradable and industrially compostable when the appropriate bio-derived polymers are used in their manufacture.

For instance, in various implementations, presented herein is a biodegradable and industrially compostable flexible foam that can be made to have similar properties and characteristics of conventional petrochemical ethylene vinyl acetate (EVA) foam or the like, and yet contain a high percentage of biomass-carbon content. Particularly, in various embodiments, biodegradable, net neutral, and industrially compostable foam precursors are used in making biodegradable and industrially compostable flexible foams, such as in an environmentally friendly manner. To achieve these goals, any number of suitable bio-derived thermoplastic feedstocks may be selected for use, and may be sourced from rapidly renewable feedstocks that don't typically compete with animal-feed or human food. Advantageously, as indicated, the carefully selected bio-derived thermoplastic foam precursors have near equivalent or equivalent technical performance properties to that of conventionally used EVA A non-limiting example of such suitable thermoplastic feedstock for use in making biodegradable and industrially compostable flexible foam of the present disclosure with near equivalent or equivalent technical performance properties to that of conventional non-renewable EVA is bio-derived PBAT co-polyesters, as described herein below. Hence, in various instances, the present devices, systems, and their methods of use may be employed so as to produce a biodegradable and industrially compostable microcellular flexible foam that may be generated from biodegradable and industrially compostable bio-derived thermoplastic resins.

More particularly, the foam precursors useful in accordance with the disclosed methods may be any suitable type of thermoplastic resin, such as a bio-derived thermoplastic resin or bio-derived thermoplastic compound produced from rapidly renewably feedstocks. Such thermoplastic resins are raw, unshaped polymers that are molten and turn to liquid when heated, and harden and turn to solid when cooled.

The creation of thermoplastics is not a simple task. Complex chemistry and mechanical processes are required in order to make the final product. In its simplest form, thermoplastics are made up of polymers and those polymers are made up of compounds. In order to produce the compounded needed to make polymers and to then make thermoplastics, different types of molecules must be broken down and separated. Typically, foam precursors are used by feeding them into a suitable injection molding machine in granular form. The granules are processed through an injection molding machine where they are liquefied and shot into a pre-formed mold cavity. Upon shot completion, the molded part is cooled and ejected from the mold in a solid-state, this process as implemented in the present embodiments is discussed in greater detail herein below.

Bio-derived thermoplastics can be described by class. A prevalent class of bio-based thermoplastic precursors and biomass. There are two types of bio-polyesters: polylactide acid ("PLA") and polyhydroxyalkanoate ("PHA"). PLA is a type of thermoplastic that is made through fermentation of bacteria. PLA is actually a long chain of many lactic acid molecules. There are many different bio-derived feedstocks for producing PLA such as sugarcane, corn, sugar beet, and lignin wood waste, just to name a few. PHA is generally produced by naturally occurring bacteria and food waste. There is a sub-class of PHA called polyhydroxybutyrate ("PHB") which is a kind of PHA that is also widely available.

In some instances, starch or cellulose fillers, and the like can be optionally included in the formation of bio-polyester blends as their inclusion makes the blend more economical and, in some instances, their use enhances the rate of decomposition. An additional type of bio-derived thermoplastic is known as cellulose acetate ("CA"). CA is a synthetic product derived from cellulose that is found in each part of a plant. Presently used feedstocks for making CA are cotton, wood, and crop waste, just to name a few. Still further, starch is yet another type of thermoplastic material. Typically, starch is treated with heat, water, and plasticizers to produce a thermoplastic. To impart strength, starch is usually combined with fillers made of other materials. Presently available feedstocks for producing starch are maize, wheat, potato, and cassava. Several petroleum-derived thermoplastics are also known that can be biodegradable. Common types are polybutylene succinate ("PBS"), polycaprolactone ("PCL"), and polybutyrate adipate terephthalate (PBAT), and polyvinyl alcohol ("PVOH/PVA"). The aforementioned petroleum-derived thermoplastics may be produced in bio-derived varieties. New bio-derived feedstocks for producing PBS, PCL, PBAT, and PVOH/PVA are being produced, and are becoming commercially available more and more thanks to technological advancements and breakthroughs. One or more of these precursors may be generated and employed in accordance with the methods disclosed herein.

Once the precursors have been generated, they may be foamed and used to make one or more end products, such as via an injection molding process, as disclosed herein. For instance, in various instances, the bio-derived thermoplastic precursors may be foamed and employed in an end product production process, such as by injection molding. In conventional foam injection molding, also known as direct injection expanded foam molding, thermoplastic polymers are first melted. When the thermoplastic polymers are evenly melted, a chemical blowing agent is dispersed into the polymer melt to make the injection compound foam-able.

The homogenous polymer compound is then injected into a mold to make the foam product. Typically, the injected polymer compound is not classified as a foam until an endothermic reaction in the heated mold cavity activates the chemical blowing agent, resulting in an expanded foam part. Consequently, the mold cavity size has to be smaller than the final part size. The actual part expansion is created within the thermoplastic polymer formula, so that when the part is ejected from the mold, it grows to the required part size.

Once the required part size is realized, it also contracts or shrinks as it cools down which often requires a secondary molding operation to obtain an accurate cooled part size. As a result, the process of managing the expansion-contraction of conventional injection molding foams can be considered tedious, time consuming, and complex. Such injection molding technology can be employed to produce the precursors and foams, as well as the products produced thereby, as discussed herein. However, in particular instances, a conventional injection molding machine may be modified, as disclosed herein so as to better effectuate the use of biodegradable, net neutral foam precursors that may be employed in a modified process so as to generate environmentally friendly foams that can be employed in producing foam products, such as furniture cushioning, shoe components, sports equipment, and the like.

Accordingly, although the conventional process may be useful in producing foamed products, in certain instances, it may suffer from some drawbacks, especially with respect to the production of a compostable microcellular flexible foam. For instance, in various instances, a typical injection molding process, when using compostable bio-derived thermoplastic resins to produce a compostable flexible foam may be deficient in various different manners. For example, the above mentioned conventional non-modified foam injection molding process may be deficient and unsuitable for producing biodegradable and compostable flexible foams. A primary reason for this stems from the very nature of the conventional non-modified foam injection molding in which the polymer compounds are crosslinked during their manufacture.

As indicated above, crosslinking can be described as the formation of covalent bonds that hold portions of several polymer chains together, occurring at random. The result is a random three-dimensional network of interconnected chains within the foam matrix. This crosslinked foam cannot readily be un-crosslinked, and thus, the various precursor ingredients cannot easily be separated back to their individual types and biodegraded or composted. As a result, the presently disclosed advantages would not readily be achievable without changing the foaming apparatus and its methods of use in manufacturing.

Accordingly, a manufacturing machine and process of using the same to generate foams in a manner that is suitable for employing non-crosslinking precursors in an injection molding process is presented herein.

Consequently, in one aspect, presented herein is a new injection molding machine. The molding machine may be configured so as to employ a variety of flexible foam compositions, including bioderived thermoplastic precursors, that can be foamed in such a manner as to produce a compostable microcellular flexible foam structure, via application of the precursors into the new injection molding machine, which can then be used to produce one or more flexible foamed products. Hence, in one aspect, provided herein is a new injection molding machine.

Some of the factors that sets the manufacturing machinery of the present disclosure apart is the use of specialized auxiliary equipment coupled with a microcellular gas dosing system that may be affixed to and thereby modify and improve a standard injection molding machine. Essentially, as presented herein a standard injection molding machine has been overhauled and retooled to function in a suitable manner for use in accordance with the present disclosure. The general method for modification begins with transforming the injection molding screw on the injection molding machine to be able to handle supercritical inert gas, such as nitrogen, $CO_2$, and/or non reactive and/or inert gasses.

A gas dosing system may then be equipped to the injection molding machine for dosing the proper gas at the appropriate amount into the polymer melt within the screw, such as prior to injection into the temperature controlled mold cavity. Additionally, a specialized mold cavity may be utilized in which the thermal temperature cycling of the mold can better control the resulting foams outer skin texture and skin thickness, as well as reducing the cycle time for part production. Further, an auxiliary gas counterpressure system may be equipped to the injection mold machine for forcing an inert gas back into the mold to counteract the liquid polymer melt being shot into the mold.

This counterpressure is useful for ensuring that the molten injection shot substantially, if not completely, fills the mold cavity and prevents part warping and shrinkage, as well as controlling cell distribution and cell density. Further, the appropriate counter pressure has a beneficial influence on skin texture and skin thickness of the part. Consequently, when the part is ejected from the mold cavity there is no discernable shrinkage and no secondary steps required for immediately using the molded foam part. Beneficially, the part is not crosslinked and as a result, it can biodegrade or compost provided that the suitable bio-derived polymer compounds are used in the foams creation.

In view of the above, in one aspect, the present disclosure is directed to creating a biodegradable and compostable, e.g., industrially, microcellular flexible foam structure. Particularly, in one embodiment, the process begins with a suitable biopolymer or biopolymer blend. For instance, in various instances, a biopolymer may be one or more polymers, such as produced from natural sources, either chemically synthesized from a biological material or entirely biosynthesized by living organisms.

There are primarily two types of biopolymer, one that is obtained from living organisms and another that is produced from renewable resources but require polymerization. Those created by living organisms include proteins and carbohydrates. Unlike synthetic polymers, biopolymers have a well-marked structure. This type of polymer is differentiated based on their chemical structure. What makes the biopolymers of the present disclosure particularly useful is that they closely mimic non-renewable EVA in terms of technical performance properties.

Likewise, in particular instances, a biopolymer blend may be employed in generating the foam structure, such as where the biopolymer blend may be a custom compound of two or more biopolymers. Several non-limiting types of biopolymers are sugar-based biopolymers, starch-based biopolymers, biopolymers based on synthetic materials, and cellulose-based biopolymers. The typical ratio of the biopolymer blended combinations would depend on the type of product being manufactured and the required technical properties of the resulting part.

More particularly, in a particular embodiment, a biopolymer blend that can be used as a foam precursor includes a plurality of resins, such as one or more solid or viscous materials that can be added to the melt to a polymer, such as after curing. Hence, after polymerization or curing, resins form polymers. For instance, a suitable resin may be one or more of: Aliphatic and Aliphatic-aromatic co-polyester origin. Generally speaking, aliphatics or aliphatic compounds relate to or denote organic compounds in which carbon atoms form open chains instead of aromatic rings. Likewise, suitable aliphatic-aromatic compounds are generally a random combination of open chains of carbon atoms (the aliphatic portion) and a stable ring or rings of atoms (the aromatic portion).

Typically, the amount of aromatic acid in the chain is lower than 49%, though recent technological advances have shown great promise for increasing this and further aiding in the biodegradation. An example of an aliphatic-aromatic is aliphatic-aromatic copolyester ("AAPE") that can be produced from any number of non-renewable and renewable feedstocks, although, renewably-sourced AAPE is particularly useful. Accordingly, in various embodiments, one or more of these aliphatics and/or aliphatics may be of co-polyester origin. Such co-polyesters are created when a polyester is modified. For instance, co-polyesters are produced when more than one diacid or diol is used in the polymerization process. In the case of aliphatic-aromatic co-polyesters, a combination of precursor changes are made to essentially hybridize or "bridge" the aliphatic-aromatic chain and combining more than one additional precursor in the polymerization process.

A non-limiting example of a suitable biopolymer blend is polylactic acid (PLA) and poly(butylene adipate-co-terephthalate) (PBAT). Polylactic acid (PLA) is a biodegradable thermoplastic aliphatic polyester derived from renewable biomass. Typical feedstocks used in the creation of PLA include fermented plant starch such as corn, cassava, sugarcane, sugar beet pulp, and to a lesser degree lignin wood waste. Likewise, Polybutylene adipate terephthalate (PBAT) is a biodegradable random copolymer, specifically a co-polyester that is commonly derived from adipic acid, 1,4-butanediol and terephthalic acid. It is advantageous to use renewably-sourced PBAT rather than PBAT sourced from non-renewable petroleum sources. In various instances, one or more of these components may be blended.

Blends of two or more thermoplastic biopolymers provide a combination of properties and price not found in a single polymer or co-polymer. There are a number of ways to blend biopolymers together successfully. A common method is to use twin-screw extrusion to melt two or more biopolymer resins together and to then extrude the molten biopolymer resin blend into a strand that is cooled and fed into a pelletizer for producing an array of pelletized pieces called a masterbatch. Another method of biopolymer resin blending is to use compatibilizing agents to join unlike chemistries together in a biopolymer blend. Commonly, this too uses twin-screw extrusion or the like to melt the compatibilizer and two or more biopolymers together in the process described above.

Accordingly, it has been determined herein that the aforementioned blended thermoplastic biopolymer resins show advantageous technical properties in forming an optimal microcellular flexible foam structure of the disclosure. Some of the enhanced technical properties include: acceptable aging properties, excellent elongation, and exceptional compression set, among other benefits. For instance, an advantage of the use of biopolymer blends, as disclosed herein, is the enhanced technical performance properties that result from the formation and use of a given biopolymer blend. Specifically, enhanced properties such as improved elongation, tensile strength, impact strength, and melt-flow, just to name a few, can all be realized when the right combination of biopolymers, and/or biopolymer-compatibilizer blends are realized.

Accordingly, these resins may be employed in accordance with the methods and machines disclosed herein so as to produce a foaming agent. Hence, in one aspect the present disclosure is directed to a foaming process. As described above, the machines and processes disclosed herein may be configured for performing a foaming operation whereby pockets of gas are trapped in a liquid or solid, which foaming may be used to produce light-weight polymeric materials. This is an advantageous solution for many types of products as the foamed materials impart a multitude of added values such as soft cushioning, comfort, technical athletic gear, including shoe components, and impact protection among others. However, in various instance, the aforementioned optimal aliphatic and aliphatic-aromatic co-polyester biopolymers or biopolymer blends alone are useful for producing a flexible foam, in various instances, their use in the production of a flexible foam may be enhanced by the inclusion of a suitable foaming agent within the foaming process.

For instance, a widely known foaming agent in use today is a chemical called azodicarbonamide ("ADA"). Azodicarbonamide is typically pre-impregnated into petrochemical thermoplastic masterbatch resins for use in conventional injection molding foam processes. Particularly, the pre-impregnation of a chemical blowing agent such as ADA are typically included in the bioplastic blend prior to foaming. The reason for this is that the pre-impregnation of a chemical blowing agent, such as ADA, is needed as conventional injection mold foaming does not allow for the customization of the foam molding variability. That is, chemical blowing agents such as ADA are limited in their ability to modify or influence the physical aspects of the foaming process during the point of manufacture.

Inversely, the specialized foaming process of this disclosure benefits from the physical foaming that a noble or inert gas, such as nitrogen, provides. In this process, the gas, e.g., nitrogen, dosing can be adjusted in concentration within the biopolymer melt and this has a direct influence on the foaming outcome, which can be seen as a major advantage to customize specific aspects of the resulting foam. Although there exists several petrochemical-derived thermoplastics which are known to be biodegradable and industrially compostable, such as PBAT co-polyesters, it is advantageous to use renewably-sourced feedstocks such as the line of neat PBAT co-polyesters.

For instance, in producing a foaming agent, it may be useful to first produce a custom-made masterbatch, such as a bioplastic blend that is tailored to produce a given type of biodegradable and industrially compostable flexible foam for a given product type. For example, different types of custom-made masterbatch compounds may be produced for different types of product applications. This can be explained by indicating that what works for making a particular type of foam in a pair of shoes, for example, may be different from what is needed for making a particular type of foam, such as for use in making a piece of furniture. Further, custom-made masterbatches can each contain different colorants for a given product use. Here again, different product types need different aspects of customization, and the ability to produce uniquely separate masterbatches is highly advantageous for these particular uses.

Unfortunately, ADA is not environmentally friendly, and it is a suspected carcinogen to human health. Consequently, its use in the present methods and the products produced thereby is limited in its advantages. Moreover, conventional petrochemical thermoplastic masterbatch resins are not biodegradable nor industrially compostable, and thus, their advantages are also limited. In view of these deficiencies in the use of ADA and conventional petrochemicals for producing masterbatch, presented herein are biodegradable, industrially compostable, thermoplastic biopolymer resins that may be used to produce masterbatch for generating a biodegradable and industrially compostable microcellular flexible foam.

In various instances, as discussed above, to achieve a more optimal biodegradable and industrially compostable flexible foam for the use in manufacturing molded end products, e.g., in an environmentally emission neutral manner, a supercritical fluid can be injected by the system into the molding process. Specifically, a supercritical fluid is a substance (liquid or gas) that is in a state above its critical temperature (Tc) and critical pressure (Pc). At this critical point gases and liquids coexist, and a supercritical fluid shows unique properties that are different from those of either liquids or gases, e.g., under standard conditions. It is advantageous to use inert supercritical fluid, such as nitrogen, CO2, He, Ne, Ar, Xe, and other such inert gasses, such as in a supercritical fluid state, which gasses that may be employed in accordance with the methods disclosed herein as a blowing agent in the foaming process.

The aforementioned supercritical fluid works by solubilizing in the polymer matrix within the injection molding machine barrel. As the specialized injection molding process injects the liquid bioplastic compound into the injection mold cavity under controlled pressure and temperature, the gas forces the polymer melt to fully expand to the maximum limits of the mold cavity. In this process, the gas is useful for maximizing the cell structure of the polymer matrix within the foaming process. This maximization of the specialized foaming process ensures that undesirable sink marks or warping within the final foamed part is minimized. This is very different than conventional chemical blowing agent-produced flexible foams in that conventional blowing agents are not subjected to the same type of supercritical states or pressures, and therefore the conventionally-produced foams lack consistency in the final foamed part, and they may contain undesirable sink marks and warping.

More particularly, in various instances, an inert gas, such as nitrogen or carbon dioxide, can be formulated in a supercritical fluid state, which may then be used as a physical foaming agent, such as in the novel injection molding machines and processes discussed herein. In such an instance, the disclosed modified physical foaming process may be employed in concert with: a suitable thermoplastic biopolymer or may be blended biopolymer master batch, such that the biopolymer or biopolymer blend and foaming agent work harmoniously for producing the most optimal biodegradable and industrially compostable flexible foams.

The suitable biopolymers, bioplastics, and bioplastic-blends of the present disclosure may be derived from renewable resources, such as those that do not compete with animal-feed and human food, and those that are derived from waste streams of renewable resources. A non-limiting example of a suitable biopolymers finding use in producing the biopolymer or biopolymer blend consist of polylactic acid (PLA), poly(L-lactic acid) ("PLLA"), poly(butylene adipate-co-terephthalate) (PBAT), polycaprolactone (PCL), polyhydroxy alkanoate (PHA), polybutylene succinate (PBS), polycaprolactone (PCL), polybutylene succinate adipate ("PBSA"), polybutylene adipate ("PBA"), and thermoplastic starch ("TPS"). Suitable biopolymer blends of the present disclosure are any combination of the above listed biopolymers and bioplastic types, as well as any hybrid biopolymer blends consists of biomass-containing poly (butylene adipate-co-terephthalate) (PBAT). A non-limiting example of this would be a lignin-containing PBAT blend where the lignin is sourced from wood waste and the PBAT is sourced from renewable resources.

Accordingly, in various embodiments, the injection molding devices and methods of their use disclosed herein are useful for producing foams having homogeneous cell nucleation. As discussed, the apparatuses and their methods of use disclosed herein may be used to produce homogenous cell nucleation so as to produce a foam whereby the foam nuclei are randomly and spontaneously generated, and thus grow irreversibly in a single phase solution system that has minimal to no impurity. For instance, as set forth herein below, in one aspect a process of manufacturing flexible and/or rigid foams is provided. The method may be implemented so as to derive an open-cell or closed-cell foam, such as where the foam has inherent compostable, antimicrobial and/or flame resistant properties.

In certain instances, the method may include one or more of the steps of forming master batch, such as including blending one or resins, e.g., copolymer carrier resins, and various foaming ingredients. In a subsequent step, the method may include adding a antimicrobial compound such that the foam material may be used in the production of antimicrobial, antibacterial, and/or antiviral footwear components, furniture components, yoga mats, apparel, sporting good components, medical devices, and/or flame resistant articles of manufacture, and other suitable uses. Particularly, in accordance with the methods herein disclosed, the produced products may be used in a vast array of applications, and generally their production method can be broken down into three distinct phases. First, the bulk polymer product is made. Next, the polymer is exposed to various processing steps. Finally, the polymer is transformed into its final product, such as clothing, anti-microbial carpets, furniture, car components, yoga mats, shoe components, including, soles, midsoles, insoles, and the like.

Particularly, this single phase solution may be employed so as to produce nucleation sites where the cells grow and are expanded by the diffusion of gas into bubbles. The machines and processes disclosed herein are particularly useful to initiate a foaming process that results in the generation of homogenous cell nucleation in a manner such that small bubbles are uniformly dispersed within the foam matrix. Specifically, unlike conventional foaming, the supercritical fluid formed flexible foams of the present disclosure benefit from greatly improved mechanical properties that may be directly attributable to the small bubble sizes. More specifically, the devices and methods disclosed herein are configured to produce bubble diameters are on the order of 100 microns or more to about 1 micron or less, such as about 50 microns to about 10 microns, or less, such as from about 20 to about 40 microns, including about 30 microns and they are produced by the use of thermodynamic instabilities, and all without the use of a conventional chemical blowing agent in the foam's creation.

For instance, in a particular embodiment, the system may be configured for using the present novel injection molding machine disclosed herein for producing a biodegradable and industrially compostable microcellular flexible foam having a homogeneous cell nucleation that may occur when a single-phase solution of biopolymer or biopolymer blend and supercritical fluid (SCF) passes through the injection gate into the mold cavity of the injection molding machine. Specifically, as explained in greater detail herein below, the present injection molding machines are configured for producing a molten material, such as by injecting a mold precursor into a mold for producing a finished part or component part. The injection molding machine may include a material hopper, an injection ram or screw-type plunger, and a heating unit. Such injection molding machines are rated in terms of tonnage, which expresses the amount of clamping force that the machine can exert.

Accordingly, the process may begin with a granular bioplastic compound being fed by a forced ram from a hopper into a heated barrel. As the granules are slowly moved forward by a specialized reciprocating screw-type plunger, a supercritical fluid is introduced through an injector by way of a separate supercritical metering auxiliary machine that may be connected directly to the injection molding apparatus that feeds into the screw. Consequently, the supercritical fluid saturates within the biopolymer melt during screw rotation and this creates a single-phase solution.

The molten mixture is then forced into a heated chamber with high back pressure where it is melted at a temperature that is controlled by a computer interface. As the plunger advances, the melted bioplastic compound is forced through a nozzle that rests against the mold, allowing it to enter the mold cavity through a gate. Hence, the present foaming process may be configured for subjecting polymeric materials to a mechanical or physical process by which heat and pressure are applied to the polymeric materials in the presence of a blowing agent. The blowing agent can be of chemical origin, as is the case with conventional closed-cell EVA foaming, or it can be of inert origin, as is the case with the biodegradable and industrially compostable flexible foams of the present disclosure. Accordingly, in view of the forgoing, as the solution enters the mold, the pressure drops, which causes the SCF to come out of solution creating cell nuclei.

Particularly, the supercritical fluid saturates within the biopolymer melt during screw rotation and this creates a single-phase solution under certain temperature and pressure. The molten mixture is forced into a heated mold chamber with high back pressure and the pressure of the single-phase solution is dropped from microcellular process pressure to atmospheric pressure, thus rapid pressure unloading occurs. The nucleation phenomena occur due to the gas separating out of the mixture. At this point, the nuclei grow into stable bubbles. The bubble size is determined by the saturation, microcellular process pressure, and the mixing temperature, which may all be controlled by the present system and methods. Consequently, when millions of nuclei are generated and the nucleus is stable, the bubble growth starts.

The bubble morphology is determined by the SCF concentration as well as the injection molding process parameters. Hence, these parameters may be selected for control by the system so as to produce a useful and/or determined bubble morphology. As the molding of the part concludes, the mold is cooled and the melt temperature decreases, which forces the melt to freeze up and solidify. Again, these parameters may be tightly controlled by the system, such as depending on the end products to be produced. Specifically, at this point the bubbles stop growing and the shape of the resulting part is fixed. The cells then grow until the material fills the mold, and the expansion capabilities of the SCF are expended.

Accordingly, in this process, the molten biopolymer and SCF blend are controllably shot into the heated mold cavity and a sudden pressure drop is experienced. Millions of tiny bubbles are produced out of the nuclei growth and these bubbles physically force the molten mixture to expand to the maximum constraints of the mold cavity. As the molten mixture expands to the maximum physical potential, the material is rapidly cooled within the mold and the bubbles stop forming, the molten mixture stops expanding, and a final solidified part is formed. All of this takes place in a matter of seconds within the injection molding system.

As indicated, this manufacturing process runs on the above described injection molding machines, which have been modified to finely control: metering, delivery, mixing, temperature, pressure, injection, speed, and the like. For instance, an auxiliary metering unit may be used to control metering for delivering accurate SCF gas dosing into the polymer melt. Specifically, a suitable gas dosing auxiliary machine may be configured to convert the inert gas into a supercritical fluid state, and to meter the dosing of the SCF delivery into the injection molding machine, such as by way of computer control mechanism.

For example, an operator or suitably configured microcontroller can program the gas dosing auxiliary machine to a pre-determined SCF gas dosing amount. Essentially, a gas dosing auxiliary machine is a SCF delivery system that may be electronically and/or physically coupled to the injection molding machine. Particular, a suitable SCF gas dosing auxiliary machine for use in the present disclosure may be configured to produce a line of gas dosing systems that are designed to convert industrial grade Nitrogen or other inert gasses into a supercritical fluid. The gas dosing apparatus may be configured to precisely dose and inject the SCF into the injection molding machine at a pressure of up to and even over 275 bar.

To operate the gas dosing apparatus, an operator may employ an associated computing device, such as a desktop or laptop computing device, that is configured for producing a graphical user interface ("GUI") for controlling the system apparatuses and respective control parameters, such as the dosing apparatus. For instance, an operator may enter the selected parameters, e.g., the desired SCF gas dosing shot parameters into the GUI. A processing element of the system then calculates all subsidiary parameters in real-time and optimizes the SCF delivery into the injection molding machine. Consequently, the control unit of the system ensures that the gas dosing system and injection molding machine work symbiotically together, such as through a network of computer-controls. Hence, this gas dosing system is a unique attribute of the present disclosure as the supercritical inert gas can be effortlessly used as a physical blowing agent for producing the biodegradable and industrially compostable flexible foams of the present disclosure in substitution of chemically-reactive blowing agents used in conventional flexible foams. This control of the mixing of the SCF into the biopolymer is useful for creating the single-phase solution.

Further, during the injection molding process of the present disclosure, SCF is injected into the polymer melt. A single phase of polymer-SCF mixed solution is obtained under definite temperature and pressure within the injection molding machine screw and barrel. The temperature and pressure may be variably controllable and relate directly to the type of flexible foam being produced and for what type of application the end product will be used. In this stage, the concentration of SCF is determined by saturation, microcellular process pressure, and the mixing temperature. An example can be provided for making a biodegradable and industrially compostable flexible foam of the present disclosure for use in making a foamed furniture, automotive, athletic, and/or shoe part, specifically a shoe midsole. A non-limiting example of a suitable biopolymer blend for use in this non-limiting example is rapidly renewable PBAT bio-polyester formed into a biopolymer compound.

Accordingly, the granulated biopolymer compound is first fed into the injection molding machine via the hopper. Next, the biopolymer is slowly moved through the injection molding machine screw and barrel when a specific SCF gas dosing is introduced and homogenously mixed into the now molten biopolymer compound, completely saturating it. The molten biopolymer compound and SCF are now a single-phase solution. A non-limiting example of the initial SCF gas concentration may be Co=0.25% with a melt temperature range of between 176° C. and 250° C., and more preferably in the range of 180° C.

Additionally, in various embodiments, the temperature within the mold can be finely controlled along with the pressure, such as in a dynamic mold temperature control ("DMTC") protocol. For instance, a DMTC process may be employed to ensure consistent cell structure within the expanding biopolymer melt. Particularly, DMTC may be configured so as to include the rapid changing and controlling of the mold temperature and/or pressure during the injection filling stage. This thereby dynamically controls the mold temperature and/or pressure in terms of both hot and cold thermal cycling, with or without pressure.

For instance, the control module of the system may be configured so as to control the mold temperature during the injection filling stage, for instance, in such instances, a dynamic mold temperature control may be employed. More particularly, compared with conventionally known injection molding processes, an important characteristic of the dynamic mold temperature control employed herein is that the mold temperature itself may be dynamically controlled. Before melt injection of the single-phase solution, the mold may first be heated to a preset upper limit. During the melt filling stage, the temperature of the mold cavity surface may be kept higher than the upper limit to prevent the melt from solidifying prematurely. When the melt filling process has concluded, the mold is cooled quickly to a lower limit (the ejection temperature), and then the molded foam part is ejected out the mold cavity.

Dynamic mold temperature control (DMTC) as implemented herein relies upon a control method based on rapid electrical rod heating and rapid water cooling. Specifically, the DMTC employed by this disclosure consists of five main components: an air compressor, a valve-exchange device, a computer-controlled mold temperature control unit, an electrically heated mold, and a cooling tower. The cooling tower may be used to supply sufficient water cooling to the mold. The air compressor is used to produce compressed air as the driving gas of pneumatic valves and to exclude residual cooling water from entering the mold after cooling. The valve exchange device is used to switch the valves to transfer different mediums from pipelines to the mold, such as hot and cold thermal cycling.

Accordingly, in various instances, the machines and processes herein may include pipes and other conduits for the passing of reacting materials, which conduits are associated with one or more heat exchange units, so as to heat and/or cool the reactants as they are pumped into and/or through the conduits and pipes. In such an instance, the exchanger may be controlled to adjust the temperature to the reactive level. On one end of the pipe a dispensing head may be included, which may be associated with one or more valves. Further, the dispensing head may be hooked up to a processing line. The electrically heated mold is used for molding the final shape of the foamed parts. The function of the mold temperature control is to control the heating and cooling of the mold; all of this is coordinated with the injection molding machine by computer-control.

Likewise, as indicated, the pressure can also be finely controlled, such as via a gas counterpressure (GCP) protocol. For instance, a GCP protocol may be utilized in the manufacturing process so as to better ensure the optimal foam structure of the end product, and to do so in a manner that there is little to no skin on the resulting flexible foam. For instance, using this GCP process a pressurized mold cavity may be injected with an SCF, which alone and together may function to counteract the expansion of the gas within the melt. Particularly, as the counterpressure is released, the gas bubbles that would conventionally breakthrough the surface are trapped inside, creating a smooth skin.

This gas counterpressure process prevents the gas bubbles from contacting and breaking through the surface of the foaming material as the foamed part is formed. This is achieved by the counteracting pressure being applied by the GCP system into the mold cavity at or around the same time of the molten single-phase solution injection shot and hold time. The inert gas bubbles are subjected immense forces and therefore the molten single-phase solution isn't given the opportunity to release the trapped bubbles to the outside of the foamed structure while being formed. The result is molded foam part with cosmetically smooth skin formed on the outside of the part.

Accordingly, as implemented herein, the controller of the system may implement a gas-counterpressure (GCP) procedure that is configured to improve the control of the foaming process by applying different gas pressures at the melt-injection stage of foam injection molding. For instance, by controlling the various components of the system, the control system may be configured to apply varying screw-contained SCF single-phase solution pressures and GCP pressures, such as in concert with proper shot sizes, shot hold times, melt temperatures, and mold temperatures.

In this manner, an entire system is created by which high-quality and commercially acceptable biodegradable and industrially compostable flexible foam parts may be produced. Specifically, subtle changes to the GCP pressures affect the surface quality of the foam. For example, without the use of GCP, the formed bubbles in the polymer melt located within the mold cavity could release and the cosmetic appearance of the resulting foamed part might not be acceptable. Additionally, without the use of GCP the skin thickness could be undesirably thick as there would be no counterpressure to counteract the rapid cooling of the molten single-phase solution as it is expanded into the mold. Particularly, the single-phase solution would hit the steel mold boundaries during the injection shot and instantly solidify with an undesirable thick skin that would not be acceptable for most commercial applications. In sum, process parameters have a demonstrable impact on the final parts quality. Accordingly, in these manners, this GCP process can be implemented in a manner to control the foaming, such as through one or more of surface quality, foam structure, skin thickness, and the like.

Hence, in various embodiments, the system may be configured so as to produce a SCF in a manner so as to form a Single-Phase Solution. Particularly, in various embodiments, a single-phase solution is created, in which the SCF may be: fully dissolved and uniformly dispersed in the molten biopolymer, which takes place inside the injection barrel under carefully controlled process conditions. For instance, as discussed the formation of a single-phase solution is critical for producing consistent mass-producible molded foam parts of the present disclosure.

Consequently, the injection molding system process should be configured to be controllable and repeatable in a very consistent manner. To achieve this, the first line of defense is to ensure that the biopolymer compounds and the SCF are homogenously mixed into a single-phase solution, such as where the single-phase solution is fully saturated and dispersed within the biopolymer melt within the injection molding machine barrel. Once a single-phase solution is achieved, the system can reliably input the desired shot weight, shot hold time, and GCP gas dosing for customizing an endlessly reproducible molded foam part in a time-optimized and mass-producible manner.

So being, the SCF should be accurately mass flow metered into the biopolymer for a fixed amount of time. For instance, the system control module may be configured such that during the dosing period, the right conditions of: temperature, pressure and shear are established within the barrel. Likewise, the back-pressure, screw-speed and barrel-temperature can be finely controlled by one or more control elements of the system. Additionally, the SCF delivery system can be modulated so as to establish the process conditions that create an optimal single-phase solution.

For instance, as discussed above, the control module may be communicably coupled to a system associated mass flow metering device that is configured to measure mass flow rate of a fluid traveling through one or more vessels, e.g., tubes, of the system. The mass flow rate is the mass of the fluid traveling past a fixed point per unit time. As it pertains to the present disclosure, the principals of mass flow metering are implemented to ensure consistent repeatability in the foam molding process. Specifically, as described above, a specially designed injector is coupled to the injection molding barrel that is capable of being controlled by computer-controlled programing of a processor of the system. Consequently, the system can be configured to implement a specific SCF gas dosing delivery into the biopolymer melt and the computer-controlled program can optimize the delivery based on the collection of real-time data from the mass flow rate, such as through feedback from one or more system sensors. This use of mass flow metering ensures the most optimal process controls for the single-phase solution of the present invention.

Accordingly, during the dosing period, the temperature throughout the system, such as within the barrel, may be controlled so as to be between 100° C. and 600° C., such as between 200° C. and 500° C., for instance, between 300° C. and 400° C., and more particularly, between the ranges of 320° C. and 380° C., including between 360° C. and 380° C. within the barrel. Likewise, the SCF delivery pressure may be finely controlled so as to be in a range of between 1,000 and 8,000 PSI, such as between 1,500 and 6,000 PSI, for instance, between 2,000 and 5,500 PSI, particularly, between 3,000 and 4,000 PSI, and more particularly between the ranges of 2,600 and 2,800 PSI.

In this manner, the control module may be configured such that temperature and pressure work in concert to generate the optimal nuclei and the resulting bubbles within the biopolymer melt and resulting foaming matrix. Additionally, with respect to shear, shear is established within the barrel when layers of molten biopolymer flow relative to each other. Hence, during injection, the molten biopolymer compound may be flowed through the melt delivery channel of the barrel nozzle, such as before entering the mold like a fountain.

Shearing is the stretching of the biopolymer between the rotating screw and the stationary barrel, causing heat to develop within the material. Hence, shear should be controlled in the injection molding process. Consequently, one or more controlling units of the system may be configured such as for controlling the injection velocity, the fill time, and the tolerance therein so as to achieve the right conditions for producing a given biopolymer compound, with a given injection molding machine size, and with a given injection molding machine screw and barrel size.

The back-pressure may also be controlled. For instance, back-pressure is the pressure in an injection molding machine that is exerted by the biopolymer when it is injected into the mold. Specifically, back-pressure is resistance applied to the injection screw as it recovers to load the next biopolymer shot into the mold. As indicated above, the various parameters of the system may be configured so as to control and/or modulate the back pressure.

Further, a controller of the system may be configured to control and modulate the screw-speed. The screw speed may be controlled by computer-control. As indicated, during the initial phase of injection molding operation, the screw rotates within the barrel to homogenize the melting biopolymer compound mixture in concert with the SCF gas. A non-limiting example of the screw speeds of the present disclosure may be from 1 or 5 or 10 to 75 or 100 or 200 rpm, for instance, from 20, 25, or 30 to 40, 50 or 60 rpm.

The system may include a heating and/or cooling control unit that may be associated with the barrel, so as to control the temperature therein. Accordingly, the control module may be configured to control barrel-temperature. Hence the barrel temperature may be controlled so as to make the temperature therein hotter or colder as necessary for the foaming process.

Accordingly, in view of the above, the SCF delivery system may include a control unit that is configured to control a combination of SCF delivery pressure and the SCF dose weight, which is typically measured in grams. The SCF pressure and dose may be controlled in a manner so as to affect the single-phase solution. That is, the smaller the SCF dose, the less SCF saturation need be within the biopolymer melt, whereas the larger the SCF does, the more SCF saturation need be within the melt. Likewise, the lower the SCF delivery pressure, the lower the uptake of the saturation, and therefore the lower the growth of the nuclei that can grow to form bubbles within the molten biopolymer melt. And the greater the SCF delivery pressure, the greater the uptake of the saturation, and therefore, the greater the growth of the nuclei that can grow to form bubbles within the molten melt.

With respect to saturation, the system and apparatus is configured for delivering a gas to the melt chamber under a temperature and a pressure such that a supercritical fluid is formed and saturates within the biopolymer melt, such as during screw rotation. Consequently, a single-phase solution is created under a controlled temperature and pressure. Specifically, a single phase of polymer-SCP mixed solution may be obtained herein under definite temperature and pressure within the injection molding machine screw and barrel. More specifically, the system controller may variably control the temperature and pressure in a manner that is dependent upon the type of flexible foam being produced and for what type of end-product is being produced.

In this stage, the concentration of SCF may be determined and controlled, such as by a feedback loop, whereby the amount of saturation is determined, such as via a sensor, which evaluates saturation process progression and then modulates microcellular process pressure and the mixing temperature based on achieving a determined set point for saturation level. In such an instance, the supercritical fluid (SCF) controllably saturates within the biopolymer melt during screw rotation and this creates a single-phase solution under definite temperature and pressure. SCF is one part of a two-part molten biopolymer compound mixture and it is used as a physical blowing agent in the presence of definite pressure and temperature in the present injection mold.

Accordingly, in view of the above, in one aspect, provided herein is a machine and method of using the same for the production of a biodegradable and industrially compostable microcellular flexible foam. Particularly, in one instance, the foam is produced and/or used in the production of foamed products, such as via a microcellular injection molding (MuCell) process, e.g., MuCell manufacturing. MuCell manufacturing employs a supercritical fluid, as described above, that is subjected to extreme pressure and dissolved into a polymer melt within a screw barrel of a manufacturing tool, such as described below, which is configured for optimizing SCF dosing for the purpose of generating a molten biopolymer melt that us heated to a liquid state.

Hence, at the heart of the injection molding machine is the injection molding machine barrel and the screw contained therein, both commonly made from tool steel. The barrel is the main delivery portal for the present single-phase solution prior to being metered and then pressed or "shot" into the dynamically temperature controlled mold component. Consequently, the biopolymer melt is delivered into the barrel through the injection molding machine hopper. And the system controller feeds a given amount of granular bioplastic pellets into the hopper as one of the first steps in the injection mold machine operation.

Specifically, during injection, the SCF vaporizes and becomes gas bubbles, e.g., foam in the form of a finished molded parts. Because the bubbles reach micron sizes, the process produces microcellular foaming. The process described herein is advantageous over conventional injection technologies, because it results in a resultant product that evidences one of more of the following: less shrinkage, light weight products, with few sink marks, and can be generated by low cost precursors. More specifically, with regard to less shrinkage, shrinkage can be controlled by understanding that volumetric shrinkage is caused by thermal contraction, which affects all polymers, and thus, shrinkage can be avoided by tracking shrinkage progress, via a system sensor, and finely controlling the barrel conditions so as to modulate the shrinkage process.

Essentially, shrinkage describes the extent to which the material changes in volume as it changes from a liquid to a solid. In conventional injection molding, the molds are not temperature controlled with pressure, so the molten polymers used by conventional methods contract upon contact with the cold tool steel of the injection mold, and this causes shrinkage. In the present machines and systems, shrinkage may be controlled and typically is a non-issue due to the temperature controlled pressurized mold which ensures the molten biopolymer fills the maximum surface area inside of the mold without premature cooling, as well as the applied uniform stress of the pressurized mold cavity itself further aiding in this regard.

With regard to the production of light weight products as a general rule, the more a polymer is expanded, the greater the reduction in weight. The present system, however, is configured for optimizing the single-phase solution by modulating the conditions via the application of appropriate pressure, temperature, and time, such that the optimum quality of a lightweight foam can be achieved. This is good for product applications that require a lightweight foam, such as in cushioning, footwear foams, and foams used to produce athletic equipment, for example. Likewise, with respect to controlling sink marks in conventional flexible foam manufacturing, sink marks and voids are caused by localized shrinkage of the material at thick sections without sufficient compensation when the part is cooling.

Particularly, a sink mark typically occurs on a surface that is opposite to and/or adjoining a leg or rib. This occurs because of unbalanced heat removal and/or similar factors. After the material on the outside of the foamed part has cooled and solidified, the core material starts to cool. Its shrinkage pulls the surface of the main wall inward, causing a sink mark. If the skin is rigid enough, deformation of the skin may be replaced by formation of a void in the core.

Unlike the sink mark and void challenges faced with conventional flexible foam molding, the machine configuration and present system parameters are controllable so as to produce a biodegradable and industrially compostable flexible foam of the present disclosure that minimizes the encountering of these issues. Particularly, in the present process, the SCF gas is controlled in a manner so to modulate, e.g., maximize, the cell structure of the polymer matrix within the foaming process. This maximization of the specialized foaming process better ensures that there are no undesirable sink marks or voids within the final foamed part.

Additionally, as indicated, a useful benefit of the present system is that it utilizes low cost materials, and the produced end products have less warping. Particularly, for many of the reasons discussed above, the present disclosure benefits from a process where the SCF gas is responsible for maximizing the cell structure of the polymer matrix within the foaming process. This maximization of the specialized foaming process ensures that there is minimal warping within the final foamed part.

Another benefit of the present system is that it may be configured so as to control tolerances. For instance, the system may be configured for performing tight tolerance flexible foamed injection molding. Particularly, tight tolerance flexible foamed injection molding as presented herein may be employed so as to produce parts that work together smoothly and contribute to an overall lower failure rate for the product.

In order for a product to work reliably and as intended, all of its parts must fit together smoothly. Accordingly, the present apparatuses and their component parts have been designed to tightly control the tolerances. Typically, these parts are produced with the best tolerance possible. There are different ranges of acceptable tolerances; for example, a very tight tolerance is +/−0.001". Sometimes even a few thousandths of an inch can mean the difference between a part that fits and one that doesn't.

Consequently, it is useful to identify tight tolerances early in the design phase. This is because the design engineers must factor in requirements for foamed part geometry, the overall foamed part size, and the foamed part wall thickness—all of which have an influence on tolerance control, and all of which can exacerbate sink marks, warping, and inconsistent part tolerances if not carefully managed. The present systems and apparatuses overcomes most of these design challenges, while still using best design practices, as the SCF gas is responsible for maximizing the cell structure of the polymer matrix within the foaming process. Likewise, the system may be configured so as to cool more quickly within the molds.

As a result of the forgoing, sink marks, warping, and inconsistencies in tolerance are greatly reduced. This is due in large part to the uniformly sized and evenly distributed microscopic cells within the foamed matrix. Accordingly, in order to achieve these benefits the microcellular foaming process should be finely controlled. For instance, as indicated, when foaming occurs along the melt front, advancement can introduce streaks and flow marks on the molded surface thereby causing imperfections.

In addition to the above, these imperfections may be further minimized herein by employing one or more of co-injection and in-mold decoration technologies. However, in many instances, this may be cost prohibitive. Nevertheless, the present system overcomes such cost prohibitive instances by selecting premium product opportunities where the added-values of the present disclosure can be accepted and appreciated.

It is to be noted that in various instances there may be disadvantages to SCF foaming, as in some instances, it can cause changes in melt viscosity and other physical properties. Particularly, when uniformly diffusing SCF into a polymer melt, the single-phase solution, acts as a reversible plasticizing agent by reducing the viscosity of the polymer by increasing the free volume. This effect also reduces the glass transition temperature of polymers as well as the tensile strength of the same. This can lead to non-uniform bubble sizes.

Non-uniform bubble sizes potentially lead to the production of a molded foam part that has inconsistent technical performance properties throughout the part and potentially non-desirable cosmetic issues as well. These are both problems when attempting to produce a consistently reproducible biodegradable and industrially compostable flexible foam that contains the same technical performance properties from part-to-part in during mass production. The present system is configured to overcome these difficulties.

Accordingly, as discussed above, to overcome these disadvantages, and to more finely control the microcellular foaming process, the above discussed gas counterpressure (GCP) is employed. As discussed above, the gas counterpressure is finely controlled such that the gas bubbles are regulated from contacting and breaking through the surface of the foaming material as the foamed part is formed. This is achieved by the counteracting pressure being applied by the GCP system into the mold cavity, which may be at or around the same time that the molten single-phase solution is injected, while controlling the hold time within the mold. The mold temperature and pressure may also be finely controlled for these purposes.

Once injected, the inert gas bubbles are subjected to immense forces and therefore the molten single-phase solution isn't given the opportunity to release the trapped bubbles to the outside of the foamed structure while being formed. Likewise, the immense forces being exerted on the single-phase solution help to better distribute the millions of tiny bubbles within the foaming structure inside of the mold, as well as to assist with bubble size consistency. The result is a molded foam part with cosmetically smooth skin formed on the outside of the part, and a consistent bubble size for repeatable technical performance properties from part-to-part during mass production.

For instance, the system may be configured so as to allow the introduction of GCP to control the foaming process, such as by applying different gas pressures and/or temperatures at the melt-injection stage. Consequently, GCP is introduced into the foaming process within the mold cavity that sits within the injection molding machine. First, an inert gas, is pumped by a gas compressor and gas pump into the mold cavity through a gas control valve. A gas pressure sensor feeds real-time data from the gas control value back to a computer-controller.

The system initiates the GCP dosing into the mold cavity by setting the dosing parameters and hold times within the computer system. The computer system then initiates the proper dosing of the inert GCP shot into the mold cavity. Without the use of GCP, the biopolymer melt would enter the mold cavity and immediately begin to foam, generating non-uniform bubbles of gas that break through the surface and create undesirable swirl marks on the exterior of the foam, which is problematic.

Likewise, the injection speed may also be finely controlled, such as where the injection speed can be determined by the difference between the screw pressure (Pscrew) and the gas pressure (Pgas). Specifically, when Pscrew is slightly higher than Pgas, and both parameters are high enough, the SCP-dissolved melt flows into the mold cavity without foaming. Setting Pscrew higher than Pgas, and Pgas lower than the critical pressure, results in partial foaming. Finally, the appropriate choice of Pscrew, Pgas, and pressure difference combined with dynamic mold temperature enables more precise control of the bubble size. Accordingly, by fine tuning these parameters flow induced streaks can be minimized if not eliminated altogether.

Specifically, these parameters may be determined in part by a consideration of the flow behavior. For instance, in one embodiment, a rheological (flow) was produced with the behavior of a polymer melt that has been dissolved with 0.4 wt % SCF of N2, under different mold temperatures (185, 195, and 205 C, injection speeds (5, 10, and 15 mm/s screw speed), and GCP's (50, 100, 200, and 300 bar). In such an instance, the measured shear rate was within the 3000-11000 s-1 range, and the glass transition temperature, Tg, was reduced from 96 to 50 C, when the GCP was 300 bar. Likewise, in this instance, as compared with conventional injection molding, melt viscosity went down by about 30% when the GCP was increased from 50 to 200 bar.

Specifically, when the GCP is 300 bar, the viscosity of the single-phase injection melt without any foaming can be reduced by as much as 50%, depending on the injection conditions. This is useful because it lowers the pressure requirements and temperature requirements, which thereby reduces manufacturing cost, specifically energy costs, and also reduces the foamed parts cycle time during production. Consequently these system parameters all for greater energy savings owing to lower pressure and temperature requirements, and less cycle times, which translates to more parts produced faster and for less money, such as by selecting the right biopolymer compound and tailoring the process temperatures, pressures, and hold times to fit the materials mechanical properties.

Additionally, as indicated, an important feature of the present machines and systems is that they may be configured for controlling the bubble size so as to be more uniform. As discussed above, this may be effectuated in part by controlling the temperature, pressure, SCF dosing control, GCP, DMTC, and other parameters discussed above. All of these attributes work in concert to ensure the optimal, most uniform bubble sizes and their optimal homogeneous dispersion within the foamed matrix. Further, the surface quality may be improved by controlling the drift of fluid along the melt front.

As its name suggests, the melt-front is the point at which the molten single-phase solution enters the molding cavity. The melt-front velocity is the melt-front advancement speed. For any mold that has a complex cavity geometry, part of the cavity may fill faster than other areas. By controlling the melt-front velocity, such as by controlling the temperature, pressure, and SCF dosing control, among controlling other parameters, a more uniform mold cavity fill speed can be achieved, and this ensures that the surface quality of the resulting foam part can be cosmetically acceptable.

Accordingly, once the single-phase solution has been created, the modified injection molding machine, as described above, maintains the solution in a pressurized state until the start of injection. For instance, the machine may be configured to achieve this through the combined efforts of a shutoff nozzle and screw position control, as indicated above. Particularly, the shut-off nozzle may be configured so as to serve as the connection between the plasticizing barrel (with reciprocating screw) and the mold. Such shut-off nozzles can be self-controlled or externally controlled, and they may be used to avoid drooling of the melt between molten shots and thus prevent depressurization and premature foaming into the mold.

Consequently, the shutoff nozzle prevents depressurization and premature foaming into the mold. For example, without a shutoff nozzle, the single-phase solution would not have sufficient pressure within the mold cavity and the desired molded foam part would not be produced. Likewise, either active or passive screw position control may be employed to prevent depressurization through the backward movement of the screw.

Particularly, the system may be configured so as to implement active screw position control, such as where the position of the screw is continuously monitored, and the pressure applied to the back of the screw is adjusted to maintain a determined position set point or a constant pressure that is held on the back of the screw. For instance, in passive position control, the oil used to regulate back pressure is prevented from draining to its tank at the end of screw recovery. This residual oil keeps the screw from moving backward due to the pressure of the single-phase solution.

Additionally, as indicated above, a proper mold design helps maintain the single-phase solution. Specifically, in those instances, where a mold includes a hot runner system, one or more valve gates may be included and controlled so as to prevent material dribbling from the nozzles, such as upon mold open. More particularly, a hot runner system may be used herein in the injection molding apparatus and may include a system of parts that are physically heated such that they can be more effectively used to transfer molten plastic from the machine's nozzle into the mold tool cavity. For instance, a "cold" or a "hot runner" can be used, such as where a cold runner is an unheated, physical channel that is employed to direct molten plastic into the mold cavity after it leaves the nozzle, and the hot runners are heated while cold runners are not.

Likewise, in various instances, the apparatus may include a nozzle break that is configured to break contact with the sprue bushing during normal operation. This configuration is useful in stack or tandem molds that employ a shutoff on the sprue bushing. Particularly, the sprue bushing may be configured to accept the machine nozzle and thereby allow for molten biopolymer compounds to enter the mold. In the event that the machine nozzle has to be disengaged from making contact with the sprue bushing, the molten biopolymer compound may drool backwards from the sprue bushing and depressurization of the mold can occur. Any molten drool waste can increase production costs, negatively affects the next shot of the melt, and can even prevent proper closure of the mold which would potentially create even more problems.

To overcome this, selecting a sprue bushing with shutoff may be employed. Otherwise, the pressure from the hot runner will be relieved through the sprue bushing. Particularly, when a sprue bushing requires a shutoff, the shutoff prevents the built-up in-mold pressure from escaping in addition to the other benefits mentioned above. Any depressurization of the mold would potentially prevent the foaming of the molten part and as a result, the desired molded part would not be formed.

As indicated above, a variety of foaming agents may be utilized for injection molding of the biodegradable and industrially compostable microcellular foams. In particular instances, these foaming agents may include inert and/or noble gases, such as inert nitrogen gas or carbon dioxide or other gasses capable of being converted into a SCF state. In accordance with the apparatuses, systems, and their methods of use disclosed herein the SCF may be introduced, e.g., injected, into the machinery, e.g., to the melt barrel such as through a specially designed computer-controlled injector that may be coupled, e.g., affixed, to the injection molding machine barrel such as for feeding the foaming agent into the molten biopolymer melt within the barrel. The injection molding machine controller may be programmed to deliver a specific SCF gas dosing amount, whether nitrogen or carbon dioxide or the like, into the biopolymer melt, which delivery may be optimized by the system controller.

Consequently, each of the aforementioned SCF foaming agents has its place, depending on the technical requirements of the final part being produced. Particularly, as indicated, a useful SCF is carbon dioxide in its supercritical state is denser than nitrogen at the same pressure yet has a much higher heat capacity. Experiments have shown that carbon dioxide in a supercritical state produces dense foams that may be useful in certain cushioning applications. By contrast, supercritical nitrogen can be used to produce the low density foamed part with smaller cells that is useful for footwear and sporting goods applications of the present disclosure.

Accordingly, a useful foaming agent for producing athletic goods, such as shoes, is SCF nitrogen gas as it provides improved weight reduction and a fine cell structure at much lower weight percentages than SCF carbon dioxide, but for furniture and automotive uses, a useful foaming agent is carbon dioxide which produces a much larger cell structure, albeit at greater size and/or weight. Specifically, in various instances, enhanced weight reduction of foamed parts is a useful characteristic for product applications requiring the least amount of weight. As a non-limiting example, it is an ongoing need for running shoes to contain flexible foams that are very lightweight and that demonstrate the ability to withstand repeated abuse.

By offering an enhanced weight reduction with fine cell structure in the aforementioned example, the injection molded flexible foam part would be relied upon for its ability to increase the runner's efficiency by way of making an acceptably lightweight shoe. Moreover, the fine cell structure of the aforementioned foam would ensure a very durable running shoe having component parts that would be capable of handling repeated impact forces arising from the runner constantly applying pressure and impact onto the foamed parts of the shoes while in accelerated locomotion.

In fact, SCF nitrogen levels will typically be at least 75 percent lower than the SCF carbon dioxide level required to achieve comparable parts. So being, the greatly reduced SCF nitrogen level requirements when compared to SCF carbon dioxide ensures the optimal material savings and time savings when mass producing the biodegradable and industrially compostable flexible foams of the present disclosure as employed in making shoe components. SCF carbon dioxide, however, is a useful foaming agent in a variety of particular situations, such as when viscosity reduction is the primary processing goal, and/or when the application can't tolerate SCF nitrogen's more aggressive foaming action.

In certain instances, SCF carbon dioxide is a suitable foaming agent, particularly in semi-flexible foams. Both flexible and semi-flexible foams can be included under the same category of flexible foams as they both are derived from polymers with a glass transition (Tg) below their service temperature, which is usually at room temperature. During the physical foaming process with a physical blowing agent, a depression in the glass transition is seen. These differences in the effectiveness of nitrogen and carbon dioxide foaming agents stem from their behavior in the biopolymer melt.

For instance, carbon dioxide, which becomes an SCF fluid at 31.1 Celsius and 72.2 bar, is 4 to 5 times more soluble in biopolymers than nitrogen, which becomes a supercritical fluid at −147 Celsius and 34 bar. For example, the saturation point in an unfilled biopolymer is about 1.5 to 2 percent by weight of nitrogen, depending on temperature and pressure conditions, while the saturation level of carbon dioxide is closer to 8 percent by weight. Carbon dioxide also exhibits a greater mobility in the biopolymer, allowing it to migrate further into existing bubbles than nitrogen. From the perspective of cell nucleation, greater solubility and mobility means fewer cells will be nucleated, and those that do nucleate will tend to be larger.

Solubility, however, becomes an advantage when the goal is viscosity reduction. An SCF dissolved in a biopolymer acts as a plasticizing agent, reducing the viscosity of the biopolymer. Because viscosity reduction is partly a function of the amount of SCF added to the biopolymer and because carbon dioxide has a higher solubility limit than nitrogen, the ability to reduce viscosity with carbon dioxide is greater. Carbon dioxide is also useful when the amount of nitrogen needed to produce a part is so low that it is not possible to consistently process parts.

Since carbon dioxide is a much less aggressive foaming agent, there are times where it is easier to run low levels of carbon dioxide. For example, 0.15 or 0.2 percent carbon dioxide as compared to very low levels of nitrogen at less than 0.05 percent. Instances as indicated in the previous example occur primarily with soft materials and parts with thick cross-sections. Accordingly, the physical foaming agent, be it SCF nitrogen or SCF carbon dioxide or other SCF, play a useful role in the final foamed parts and the eventual products that will contain them.

Firstly, selecting the appropriate combination of compatible biopolymer or biopolymer compound and the associated SCF gas is useful. Secondly, properly utilizing the SCF gas by way of the optimal dosing weight and pressure is critical to ensuring the maximum saturation within the single-phase solution, and for ensuring the optimal generation of nuclei for producing millions of uniform bubbles within the foaming matrix. Additionally, the end result, a homogenously formed injection molded flexible foamed part, relies upon all aspects of the SCF and GCP gas dosing process working symbiotically with the injection molding machine temperature, pressure, and hold time for achieving commercially acceptable molded foamed parts, as explained above.

As indicated, in one aspect, a process of manufacturing biodegradable and industrially compostable flexible foams, whether open-cell or closed-cell is provided. In various instances, the manufacturing process includes one or more of the following steps. First, a thermoplastic biopolymer may be blended into a masterbatch for foaming. As a non-limiting example, the referenced masterbatch may be produced by a twin screw extruder in which two or more biopolymers, fillers, and/or additives may be homogenously blended into a single polymer melt, such as within the extrusion barrel. The molten biopolymer blend is then strand-extruded, cooled, and pelletized into granules called a masterbatch, which may then be processed as described above. Any combination of suitable biopolymers, bioplastics, fillers, additives, and colorants may be incorporated into the masterbatch production. Accordingly, once produced the thermoplastic biopolymer blend may be injection molded into a suitable mold shape with a SCF, such as inert nitrogen or carbon dioxide gas.

As described above, the present injection molding may be employed in a manufacturing process for producing parts by injecting molten material into a product mold. In the present disclosure, a suitable biopolymer or biopolymer blended compound is selected, such as in granular form. The aforementioned granules may be pre-dried in an auxiliary pellet drier to ensure any latent moisture is removed. The pre-dried pellets may then be introduced into the injection molding machine hopper. The operator then selects the optimum barrel temperatures, nozzle temperature, and mold temperatures of the injection molding machine, and inputs these values by computer-control.

Further, the optimal SCF gas dosing percentage and pressure as well as the optimal GCP gas dosing and pressure may be scaled and these values may be input into or be otherwise determined by the system control unit, e.g., dynamically. Once the system is properly configured, the injection molding machine is ready to operate. The granules may be released into the screw and barrel of the injection molding machine in an amount specified by computer control where they are melted at a specific temperature or set of temperatures.

The SCF gas is introduced into the injection molding machine barrel through the SCF injector by computer control under controlled pressure and dose size. The SCF saturates the now molten granules and a single-phase solution is generated. Then, with proper back pressure and screw positioning, the injection molding machine sends a measured shot of single-phase solution into the dynamically temperature controlled mold cavity. Nuclei growth is experienced within the melt and millions of microcellular bubbles are formed within the biopolymer melt. Substantially simultaneously, the GCP system sends a pre-metered dose of counterpressure gas into the mold by computer control that optimizes the uniformity of the cells and conditions the surface texture for an optimal cosmetic appearance. The dynamically temperature controlled mold temperature may then be switched to water cooling and the formation of the bubbles and the expansion of the melt stops. At this point, the flexible foam molded part is now formed and it is ejected from the mold.

Particularly, as indicated above, the system may be configured so as to implement dynamic mold temperature control, which may be used to produce optimal cell structure. For instance, as described, dynamic mold temperature control (DMTC) implements rapid electrical rod heating and rapid water cooling. More particularly, the DMTC procedure employed herein may include one or more of the following five main components: an air compressor, a valve-exchange device, a computer-controlled mold temperature control unit, an electrically heated mold, and a cooling tower. The cooling tower is configured to provide water cooling to the mold, for the performance of cooling operations, while a suitably configured air compressor generates compressed air to drive gas through pneumatic valves so as to exclude any residual cooling water from entering the mold after cooling. One or more valve exchange devices may be configured and employed to switch the valves to transfer different mediums from the various machine pipelines to the mold, such as for hot and cold thermal cycling. An electrically controlled heating element may be included and configured for molding the final shape of the foamed parts. Together the water tower and heating element may function so as to finely control the mold temperature so that the heating and cooling of the mold may be rapidly heated and/or cooled in performance of the molding process.

All of this is coordinated with the injection molding machine by the suitably configured computer processor. For instance, a non-limiting example of the cooling water temperature control of the DMTC system of the present invention may be 15 to 30° C., and a further non-limiting example of the heating element temperature range of the DMTC system may range between 60° to 150° C., and may be in the range of 90° C. to 130° C., and may be any temperature there between. In these manners, the biopolymer melt, pressure, and time may be controlled such that a desirable flexible foam is formed.

Particularly, during the injection molding process of the present disclosure, SCF is injected into the polymer melt. A single phase of polymer-SCP mixed solution is obtained under definite temperature and pressure within the injection molding machine screw and barrel. The temperature and pressure may be variably controllable by computer-control and relate directly to the type of flexible foam being produced and for what type of end product application. By applying varying screw-contained SCF single-phase solution pressures and GCP pressures, in concert with proper shot sizes, shot hold times, melt temperatures, and mold temperatures, an entire system is created by which high-quality and commercially acceptable biodegradable and industrially compostable flexible foam parts may be produced, such as by utilizing gas counterpressure in the injection molding process so as to ensure the optimal foam structure with the least amount of cosmetic defects and little to no plastic skin on the outside of the foamed part.

As indicated, a useful benefit of the products produced in accordance with the devices, systems, and their methods disclosed herein is that they may be biodegradable and/or compostable, such as in a home or an industrial composting protocol. Particularly, producing goods that are configured for being decomposed in an industrial composting regime ensures that the flexible foam will last the usable life of the resulting product, such as by functionalizing it in a manner so that it does not breakdown or fall apart mid-use within the finished goods. For example, it would be detrimental for a person to purchase furniture, a pair of shoes, or other athletic equipment that were made from the flexible foam of this disclosure only to have the foam degrade during regular use before the end of the products usable life.

More particularly, the present disclosure benefits from the use of an inert physical foaming agent and biodegradable and industrially compostable biopolymers or biopolymer compounds. These two aspects come together to form a single-phase solution that is functionalized within a specialized flexible foam injection molding system. The outcome is biodegradable and industrially compostable flexible foams for use in numerous types of end-products; a non-limiting example of which is footwear foams for use in making shoes. The resulting flexible foams are non-crosslinked, chemical-free, and environmentally benign.

At the end of the biodegradable and industrially compostable flexible foams life, it can be redirected through waste-diversion to appropriate industrial composting facilities whereby the foam is ground up and industrially composted into useable biomass. The end result produces a system by which aspects of the so-called circular economy are adhered to. The flexible foam of the present disclosure starts and ends as "dirt-to-dirt" meaning that the natural biological process has been adapted to make materials and products for human use with the least amount of environmental impact. These flexible foams do not compromise on either technical performance properties during their useable life, nor on their environmentally conscious design.

As discussed herein above, the devices, systems, and their methods of use herein may be employed for the purpose of producing one or more molded end products, such as for components for use in footwear, seating, automotive, protective gear, and/or sports gear. Accordingly, in various embodiments, provided herein is one or more components useful in the construction of a shoe, such as a sole, midsole, and/or insole thereof, such as where the sole forms the base of the shoe, and is configured for making contact with the ground, the midsole forms an intermediate structural and cushioning element, and the insole is configured for being inserted within a shoe and thereby providing cushioning and/or support to the shoe.

In certain embodiments, the shoe component may include a foam material produced herein that may be environmentally friendly, bio-degradable, and compostable. In various instances, each individual component may be composed of a plurality of layers including a base layer and a cushioning layer, such as where the cushioning layer. For instance, in particular embodiments, a support member such as a support member being coupled to the base layer may be included, and where the component is an insole, at one or more of an arch contacting or heel contacting portion may be included.

Particularly, in various embodiments, a foamed material may be produced such as where the foam materials may be used in the production of cushions, cushioned furniture, shoe components, such as insoles thereof, mats, fibers, weaves, and the like. Other useful products may include caulking, such as silicone caulking, silicone medical gloves, silicone tubing for drug delivery systems, silicone adhesives, silicone lubricants, silicone paints, and other suitable silicone products, e.g., condoms. In various embodiments, the foam products may be produced in a manner where the foamed material may have one or more anti-microbial, anti-bacterial, anti-fungal, anti-viral, and/or anti-flammable properties.

More particularly, in one aspect, this disclosure may be directed generally to a process for the manufacture of furniture, such as upholstered furniture and/or the cushions thereof, such as furniture that includes or is otherwise comprised of foam, e.g., that is biodegradable and/or compostable. Hence, the foams of the disclosure are advantageous for use in the manufacture of furniture that includes such produced foam inserts. The resins and foams produced and employed have proven to be advantageous for use as cushioning materials, such as for pillows, couches, beds, seat cushions, or for other upholstering furniture, and the like.

For instance, in accordance with the methods disclosed herein above, a mold of a small to large block of foam can be produced, such as to form a foam insert, such as for use in furniture or car accessory components. The block foam may then be cut into smaller blocks of the desired size and shape, based on the type and form of the furniture being produced. Specifically, the sized and cut blocks may then be applied to or otherwise fit within the furniture or car frame or other bounding material, together which may be covered to produce the final furniture product, whether it be a pillow, sofa, a cushion, e.g., a sofa or car cushion, or the like. Additionally, where desired, an outer casing or bounding material may be attached to the frame material, such as by stapling, and/or tacking, or otherwise fastened to the frame of an article to be upholstered and covered with a fabric or other material.

Accordingly, in various embodiments, when manufacturing upholstered furniture, such as a couch or a car seat, a frame may be produced. Various internal, e.g., structural, components of the furniture may be installed within the frame, such as springs or the like, and then the foamed sheets, produced in accordance with the methods disclosed herein above, may be positioned in, over, and around the springs, such as for cushioning and/or insulation. Of course, other materials may be included, such as layers of cotton, wool, felt, rubber-based products, and the like, and a cover material may then be added so as to cover the frame and finish the product manufacture.

Specifically, the present foams along with other materials disclosed herein may function as padding, or filling, which may be shaped, adjusted, and tucked beneath a cover as the cover material is stretched over the frame. Additionally, as indicated, in various instances, the foam products produced herein are useful in and above those known in the art for a number of reasons, not the least of which is the fact that typical PU and/or EVA foams are not in any manner biodegradable, whereas the component of the foams produced herein are. Hence, in various embodiments, a method of constructing furniture upon an open frame is provided. For instance, in one instance, the method may include one or more of the following steps.

Particularly, the method may include providing a frame, the frame defining back, a plurality of side walls, and seat portions, such as where the back frame portion is extended substantially vertically and the seat portion extends substantially horizontally, relative to one another, in a manner such that the seat portion transects the vertical portion. The method may further include cutting a flat sheet of foam to appropriate size and shape to provide padding for the back and seat and/or side wall portions, cutting flat cover material to appropriate size and shape to finish the back, seat, and/or side wall portions, attaching the foam sheets and the cover material together at spaced positions and compressing the foam to form a contoured predetermined design in the outer surface thereof, and to form a substantially flat sub-assembly wherein the foam sheet and cover material are free for relative movement intermediate the positions of attachment, and shaping and attaching the sub-assembly to the frame. The cover for the foam cushion or cushioned article can be any suitable covering material ordinarily used in upholstering furniture and covering ornamental pillows and the like, such as woven woolen fabrics, woven nylon fabrics, or fabrics woven from other various synthetic fibers as well as such materials as leather and the like.

Further, in another aspect, this disclosure is directed generally to a process for the manufacture of shoe components, such as soles, midsoles, and/or the insoles of shoes, such as shoe components that include or are otherwise comprised of foam, e.g., compostable foam. Specifically, in particular embodiments, methods for making soles, midsoles, insoles, and/or other shoe inserts are provided. For instance, the present shoe insert may be a form of cushioning device that is adapted to be inserted or otherwise fit within a shoe, e.g., a running shoe or sneaker, which may be configured so as to reduce the impact of a foot hitting a surface, e.g., the ground while running or walking, thereby absorbing and/or attenuating shock to the foot.

Particularly, shoe sole components, including midsoles and inserts may include of one or a multiplicity of layers. For instance, in some instances, a base layer, a foam layer, and/or a fabric layer may be provided. Specifically, a base layer of a relatively resilient material, and/or a foam layer, e.g., disposed over the base layer, and/or a fabric layer disposed over the foam layer may be included. Accordingly, the method may include integrally forming the base layer, the foam layer, and the fabric into a tri-laminate sheet. In various instances, a support layer may be disposed at least a heel area, which support layer may be constructed of a rigid material, such as of higher density than that of the laminate. An adhesive, glue, or other attachment mechanism may be provided and employed for attaching and forming the tri-laminate with the support layer.

More particularly, in other instances, the method for making a shoe component, such as an insert, may include the steps of: providing a foam layer and/or providing a fabric layer; heating the foam layer; joining the foam and fabric layers; providing a base layer, e.g., a base layer having a density that is the same, greater, or a lesser density as to the foam layer; and heating at least one of the base layer and foam layer so as to couple the base layer with the foam layer so as to form a dual or trilaminate.

The methods may further include providing a pre-formed support member, such as an arch support and/or heel member, which members may have a density substantially the same, or less, or greater than the density of the foam layer. In particular instances, the support member may be formed of a compressed foam material so as to obtain greater density, and thus greater rigidity in comparison to that of the foam layer. Additionally, a heat and/or pressure reactivatable adhesive may be applied between the support and/or heel member and the laminate. A molding pressure may then be applied to the composition so as to cause the forming and/or shaping of the trilaminate into the support and/or heel member so as to form an integral one-piece shoe insert, with the pre-formed heel member forming a rear portion and/or the support member forming a mid-portion of the bottom surface of the finished shoe insert, e.g., at the mid and/or heel area thereof, and the base layer forming the bottom surface of the finished shoe insert at the forward area thereof.

It is to be noted, however, that a support and/or heel member need not be included, and in some instances, one or more of the laminate components may be excluded or other laminate layers added. It is further to be noted that, in certain embodiments, the foam layer may be more flexible and/or cushioning, e.g., having a greater durometer, than the base layer, which in turn may be more flexible and/or cushioning, e.g., having a greater durometer, than the support member.

Hence, the more flexible foam and base layers may be relatively resilient and conform in shape to the desired shoe size and configuration, whereas the support layer(s) may be relatively more rigid.

Particularly, as indicated, the foam layer and/or one or more of the support layers may be constructed of the herein disclosed biodegradable and/or environmentally friendly foam material. Specifically, the support layer may be of a denser foam thus making the support layer more rigid. Hence, in various embodiments, the foam layer may have a density of about 2 or about 3 or about 5 to about 10 lbs. per cubic ft. or more, such as a density in the range of between about 4-6 lbs. per cubic ft. Additionally, the foam layer may have thickness of 1/8"+ or −5%, such as in a range of thickness of about 3/32"-5/32".

Likewise, the base layer may also have a density of about 2 or about 3 or about 5 to about 10 lbs. per cubic ft. or more, such as a density in the range of between about 4-6 lbs. per cubic ft. The thickness of the base layer may be on the order of about 5/16"+ or −10%. However, in various instances, the thickness of the base layer may range from about 1/4" or less to about 7/16" in thickness. With regard to the support layer, which may be formed primarily at the arch and/or heel areas of the insert, which may also be made of the biodegradable and/or compostable foam disclosed herein.

However, the support layer may be made by being compressed so that the final density is on the order of 22-23 lbs. per cubic ft. The fabric layer may be constructed of any suitable material, for example, cotton, polyester, or a polypropylene knit. In various instances, the material and foam layers may be laminated together by a flame lamination technique that employs an open flame which is directed to the foam layer. The open flame generates sufficient heat on the surface to cause melting of the flat sheet foam layer. Once melted, the fabric layer may be joined therewith and the two sandwiched together layers may be run between chilled rollers, while sufficient pressure is applied between the rollers so that the two layers are joined together.

At this point in the process, these layers are still maintained in a flat sheet form. These integrated layers may then next joined, also by flame lamination, to the base layer. The previously integrated material and foam layers may be joined to the support layer and these multi-laminated layers may then be run between chilled rollers. At this stage of the process, these layers are still in flat sheet form. The layers thus laminated to this point are then ready for molding. This may be performed by heating the laminated layers to a molding temperature of approximately 250 F, such as for a period of about 1 to about 5 minutes or more, e.g., about 225 seconds. This heats the previously laminated layers sufficiently to permit them to be inserted into a mold.

The following is a description of various implementations of the present disclosure which makes reference to the appended figures. Accordingly, in one aspect, a footwear component is provided. Particularly, as illustrated in FIG. 1, an embodiment of the present disclosure is a footwear component, namely a microcellular flexible foam shoe midsole 100 that is made of a biodegradable and industrially compostable thermoplastic biopolymer blend 102.

Specifically, the biodegradable and industrially compostable injection molded microcellular flexible foam shoe midsole 100 is made from one or more of a biopolymer and a biopolymer blend, such as including a thermoplastic biopolymer. Particularly, the thermoplastic biopolymer or biopolymer blend used to manufacture the biodegradable and industrially compostable injection molded microcellular flexible foams can be optionally created from any number of aliphatic and aliphatic-aromatic co-polyesters, or the like.

A non-limiting example of a suitable biopolymers finding use in producing the biopolymer or biopolymer blend consist of polylactic acid (PLA), poly(L-lactic acid) (PLLA), poly(butylene adipate-co-terephthalate) (PBAT), polycaprolactone (PCL), polyhydroxy alkanoate (PHA), polybutylene succinate (PBS), polycaprolactone (PCL), polybutylene succinate adipate (PBSA), polybutylene adipate (PBA), and thermoplastic starch (TPS). Additionally, hybrid biopolymer blends may be utilized in the manufacture of the biodegradable and industrially compostable injection molded microcellular flexible foams. A non-limiting example of a hybrid biopolymer blend consists of algae-containing poly(butylene adipate-co-terephthalate) (PBAT).

In the provided example, the algae portion of the hybrid biopolymer consists of any suitable species of algae in a dried powder form. Several non-limiting examples of suitable algae species include blue-green algae, green algae, red algae, brown algae, and diatoms, and combinations thereof. The aforementioned dried algae powder can be twin-screw extruded on standard equipment with the PBAT biopolymer such that the algae powder denatures into the polymer chain of the PBAT. This thereby forms a hybrid biopolymer for use in the manufacture of the biodegradable and industrially compostable injection molded microcellular flexible foams of the present disclosure.

The produced foam products may include or otherwise incorporate a number of the following ingredients: a filler powder and/or one or more additives. Particularly, depending on the application, additives may be utilized in the biopolymer formulations as well. For example, oligomeric poly(aspartic acid-co-lactide) (PAL) may be optionally compounded into masterbatch for accelerating biodegradation. Additionally, fillers such as precipitated calcium carbonate from aragonite, starches, or the like may be utilized to reduce part cost while maintaining the renewable and biodegradable integrity of the finished flexible foams.

Further, additional additives for use in the biopolymer formulations may consist of one or more of the following. Nucleating agents, such as micro-lamellar talc or high aspect ratio oolitic aragonite, may be included. Such nucleating agents can greatly improve key properties of the resulting flexible foam by preventing cellular coalescence, lowering bulk density, and improving rebound resilience, among other beneficially enhanced attributes. Several non-limiting examples of nucleating agents for use in producing biodegradable and industrially compostable injection molded microcellular flexible foams are micro-lamellar talc marketed as Mistrocell® by Imerys Talc America Inc., Houston, Texas and high aspect ratio oolitic aragonite marketed as OceanCal® by Calcean Minerals & Materials LLC, Gadsden, Alabama.

Colorants, Dyes, and Pigments may also be included. For instance, various colorants such as dyes, pigments, or biopigments may be optionally used in the biopolymer formulations of the present invention. Several non-limiting examples are natural pigments of plant origin that have been tailor-made for biopolymer use, such as a wide range offered by Treffert GmBH & Co. KG, Bingen am Rhein, Germany or those offered by Holland Colours Americas Inc., Richmond, Indiana.

There exist a number of configurations and embodiments that may be employed depending on: the desired physical properties, and the intended end-use of the shoe midsole 100, be it for work, recreation, water-use, or the like, that should not be limited by these examples.

Figure 2:
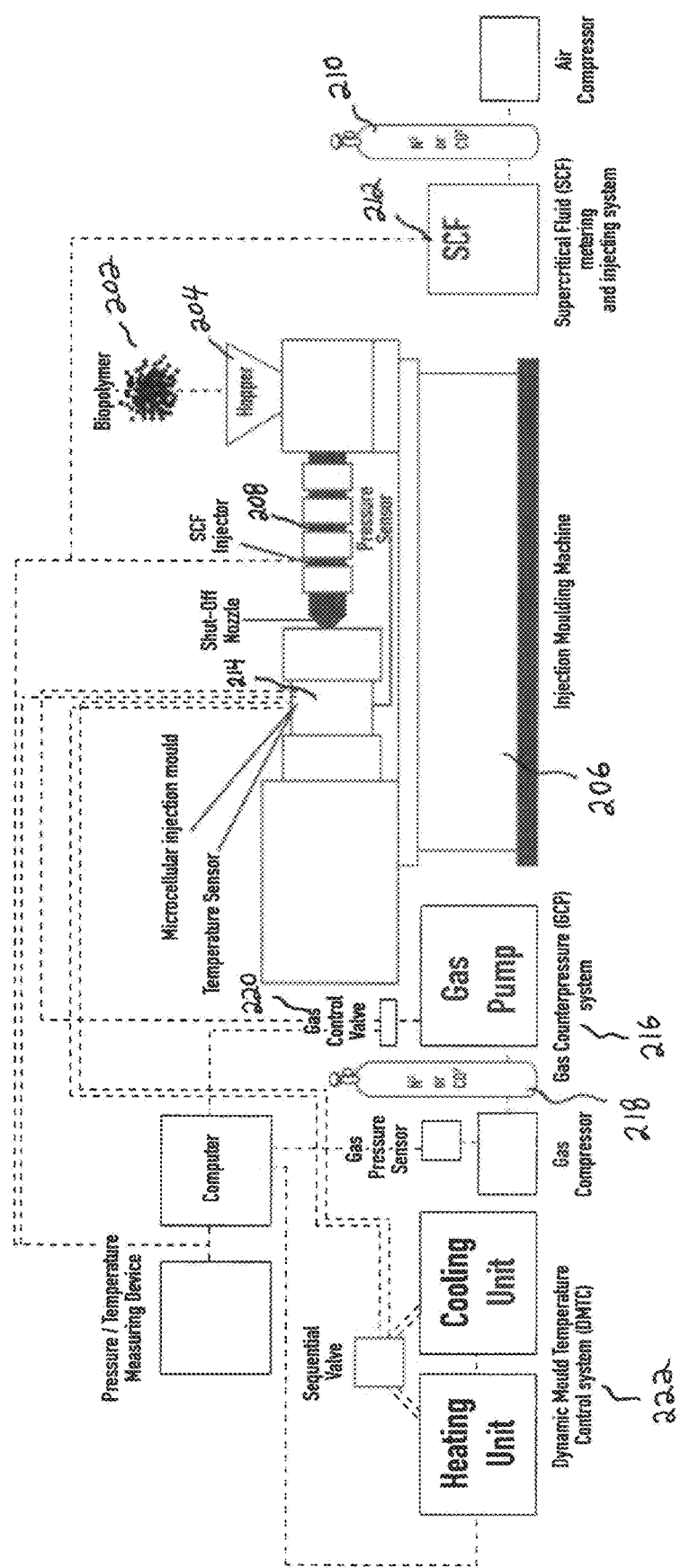
FIG. 2 illustrates a schematic overview of the injection molded microcellular flexible foam system for producing biodegradable and industrially compostable flexible foams, suitable for footwear.

A suitable device of the system may be exemplified in the system 200 shown in FIG. 2 and may be employed in the production of a foam material as disclosed herein above. For instance, in use, a biopolymer masterbatch 202 is fed into the hopper 204 of any suitable injection molding machine 206. The biopolymer masterbatch 202 is liquefied by heating while being transported through the injection molding machine screw 208. The nitrogen or CO2 gas 210 is injected into the biopolymer melt and mixed 212. Further, the biopolymer-gas mixture is under pressure and is injected into the injection molding tool 214. In concert with the biopolymer-gas injection, the gas counterpressure system 216 sends a dose of metered nitrogen or CO2 gas 218 into the pressurized molding tool 214 via the gas control value 220.

Shortly thereafter, the dynamic mold temperature control system (DMTC) 222 is controlling and adjusting the temperature inside of the molding tool 214. The molding tool 214 is then sufficiently cooled and the resulting biodegradable and industrially compostable injection molded microcellular flexible foamed part is ejected from the injection molding machine 206.

Figure 3:
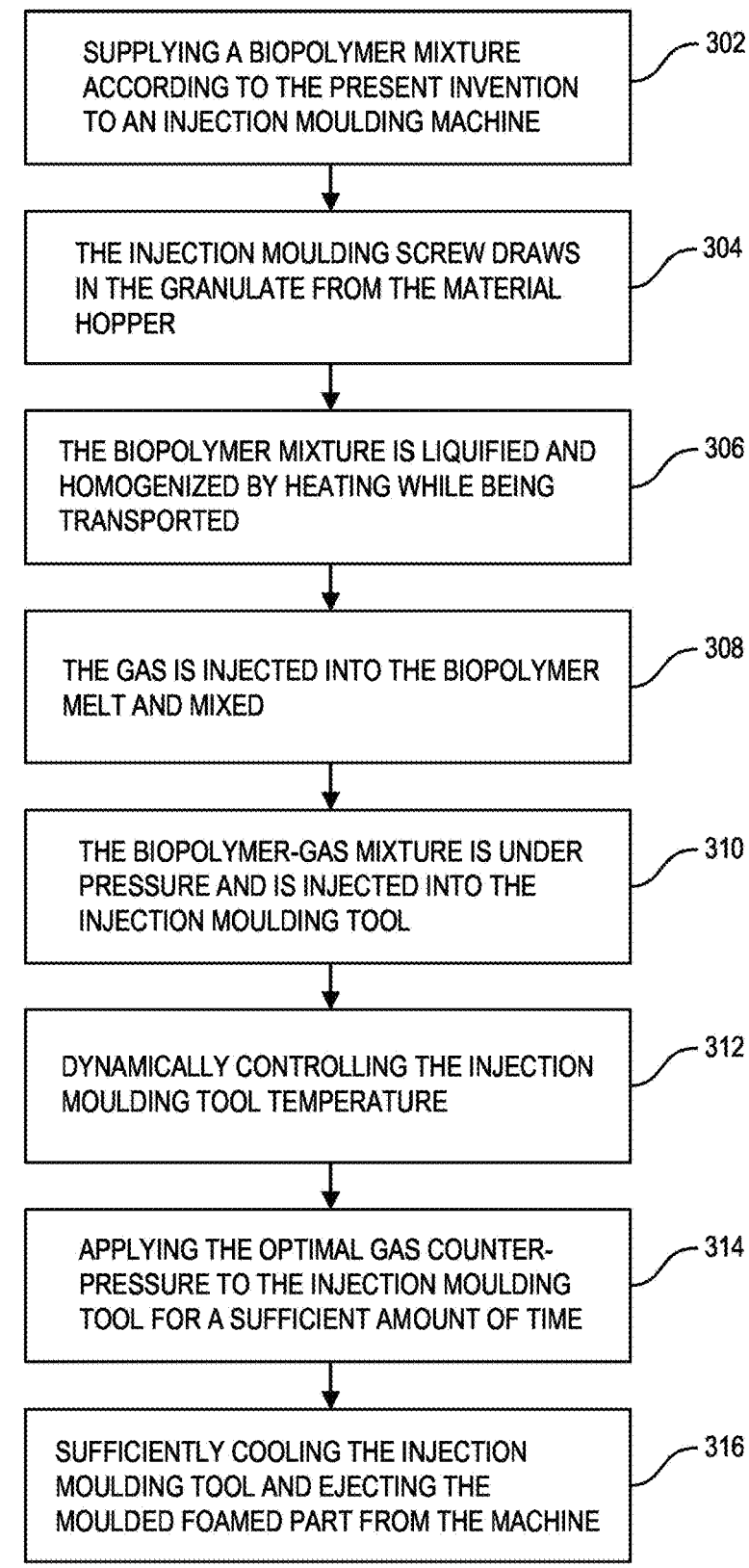
FIG. 3 is a flowchart of a method for manufacturing biodegradable and industrially compostable injection molded microcellular flexible foams.

FIG. 3 provides a flowchart to illustrate the method 300 of producing a biodegradable and industrially compostable injection molded microcellular flexible foam. At 302 a biopolymer mixture is supplied to an injection molding machine, and at 304 the mixture is drawn into the injection molding machine through the material hopper. At 306, the biopolymer mixture is liquefied and homogenized while being transported through the injection molding machine screw. At 308, the nitrogen or CO2 gas is injected into the biopolymer melt. At 310, the biopolymer-gas mixture is under pressure and injected into the injection molding tool. At 312, the injection molding tool temperature is dynamically controlled to ensure the optimal cell structure. At 314, the optimal dose of gas counterpressure is applied to the injection molding tool for a sufficient amount of time to ensure the ideal foam structure with minimal skin thickness. At 316, the injection molding tool is sufficiently cooled and the resulting molded foam part is ejected from the injection molding machine.

In some implementations, and without imparting limitations to the disclosure herein, a biodegradable and industrially compostable flexible foam manufacturing process includes the steps outlined below. Process set-up procedures revolve around establishing a controlled SCF dosing into the injection barrel: under screw speed, temperature, and pressure conditions that result in a single-phase solution.

Ensuring that the basic conditions of SCF dosing are met, there are primarily seven process setpoints to adjust: SCF Delivery Pressure: Setting the bioplastic pressure against which the SCF is dosing during screw 208 rotation. This refers to both the specific biopolymer back pressure during screw recovery and also to screw position control during screw idle. As a non-limiting example, pressure setpoints for the biopolymer delivery could be in the range of 2,000 psi and 3,000 psi, and more preferably in the range of 2,700 psi and 2,800 psi. This setpoint sets the screw position at which the SCF dosing starts, which can then set the SCF injector to the open or closed position. The position should be set so that the pressure in the barrel during screw recovery has become stable prior to the start of dosing. As a non-limiting example, the open position could be in the range of 0.3 and 0.4 inches.

The percentage of the shot size and SCF may also be controlled. This controls the actual mass of SCF dosed during each cycle. As a non-limiting example, the shot size could be in the range of 100 grams to 300 grams, and more preferably 200 grams. A non-limiting example of the SCF percent could be in the range of 0.45% and 0.75%, and more preferably 0.5%. The system may also be configured for optimizing dosing. This is accomplished by maximizing the dosing time and minimizing the flow rate (pressure difference between the pre-metering pressure and the delivery pressure). A non-limiting example of the dosing time is between 1-2 seconds, and more preferably 1.7 seconds.

A dynamic mold temperature control (DMTC) may also be implemented. This is a process that involves the rapid changing and controlling of the mold temperature during the injection filling stage so as to thereby dynamically control the mold temperature in terms of both hot and cold thermal cycling. Before the melt injection, the mold is first heated to a preset upper limit. During the melt filling stage, the temperature of the mold cavity surface is kept higher than the upper limit to prevent the melt from solidifying prematurely.

When the melt filling process has ended, the mold is cooled quickly to a lower limit known as the ejection temperature, which is the temperature that the part is ejected out the mold cavity. A non-limiting example of the optimal mold temperature range of the present disclosure is between 40° C. and 150° C. with a cooling speed of between 1° C. per second and 15° C. per second, and more preferably 11° C. per second. A non-limiting example of the mold cooling time of the present invention is between 80 seconds and 100 seconds.

Likewise, the gas counterpressure (GCP) may also be controlled. This is a process that includes a pressurized mold cavity that is injected with nitrogen gas to counteract the expansion of the gas within the melt. As the counterpressure is released, the gas bubbles that would conventionally breakthrough the surface are trapped inside, creating a smooth skin. The GCP controls the foaming through surface quality, foam structure, and skin thickness. A non-limiting example of gas counterpressure of the present invention is Obar/10 bar/30 bar/50 bar with a holding time of between I second and 25 seconds, and more preferably 5 seconds. A non-limiting example of the average microcellular cell diameter of the present invention can be measured in micrometers (μm) between I-micrometer and 100-micrometers, and more preferably 40-micrometers.

In view of the above, in some implementations, a suitable thermoplastic biopolymer blend is produced. Once the thermoplastic blend is produced, the thermoplastic biopolymer blend may be injection molded into a suitable mold shape, such as with the addition of an inert gas, such as nitrogen gas. Additionally, pressure may be finely controlled as well.

For instance, utilizing gas counterpressure in the injection molding process may be implemented. This is also useful for further ensuring the optimal foam structure with the least amount of cosmetic defects, and little to no plastic skin on the outside of the foamed part, which is important in making a foamed product that may have a multiplicity of final uses, based on the mold shape. The molding process may include the implementation of a dynamic mold temperature control. For example, in various embodiments, dynamically controlling the temperature of the molding process is useful for achieving optimal cell structure. Other elements of the molding process that can be controlled include controlling: the biopolymer melt, the pressure, and time, such that a desirable flexible foam is formed.

Accordingly, in view of the above, the present disclosure relates to a process for injection molded microcellular foaming various flexible foam compositions from biodegradable and industrially compostable bio-derived thermoplastic resins for use in, for example, footwear components, seating components, protective gear components, and watersport accessories.

Creating a biodegradable and industrially compostable microcellular flexible foam structure begins with a suitable biopolymer or biopolymer blend such as those of aliphatic and aliphatic-aromatic co-polyester origin. A non-limiting example of a suitable biopolymer blend is polylactic acid (PLA) and poly(butylene adipate-co-terephthalate) (PBAT). The aforementioned blended thermoplastic biopolymer resins have shown advantageous technical properties in forming the optimal microcellular flexible foam structure of the invention. Some of the enhanced technical properties include acceptable aging properties, excellent elongation, and exceptional compression set, among other benefits.

The optimal aliphatic and aliphatic-aromatic co-polyester biopolymers or biopolymer blends alone cannot produce a flexible foam without a suitable foaming agent and foaming process. The most widely known foaming agent in use today is a chemical called azodicarbonamide (ADA). Azodicarbonamide is typically pre-impregnated into petrochemical thermoplastic masterbatch resins for use in conventional injection molding foam processes. Unfortunately, ADA is not environmentally friendly, and it is a suspected carcinogen to human health. Moreover, conventional petrochemical thermoplastic masterbatch resins are not biodegradable nor industrially compostable. To achieve the most optimal biodegradable and industrially compostable flexible foam for the aforementioned invention, inert nitrogen gas or carbon dioxide in a supercritical fluid state is used as a physical foaming agent in a modified injection molding process. A modified physical foaming process is employed in concert with a suitable thermoplastic biopolymer or blended biopolymer masterbatch such that the biopolymer or biopolymer blend and foaming agent work harmoniously for producing the most optimal biodegradable and industrially compostable flexible foams.

The injection molded process of this disclosure relies upon the homogeneous cell nucleation that occurs when a single-phase solution of biopolymer or biopolymer blend and supercritical fluid (SCF) passes through the injection gate into the mold cavity. As the solution enters the mold, the pressure drops which causes the SCF to come out of solution creating cell nuclei. The cells then grow until the material fills the mold, and the expansion capabilities of the SCF are expended. This manufacturing process runs on injection molding machines that have been modified to allow the metering, delivery, and mixing of the SCF into the biopolymer to create the single-phase solution. Dynamic mold temperature control (DMTC) is employed to ensure consistent cell structure within the expanding biopolymer melt. DMTC can best be described as the rapid changing and controlling of the mold temperature during the injection filling stage; this thereby dynamically controls the mold temperature in terms of both hot and cold thermal cycling. Gas counterpressure (GCP) is also utilized in the manufacturing process to ensure the optimal foam structure with little to no skin on the resulting flexible foam. GCP can best be described as a process that includes a pressurized mold cavity that is injected with SCF to counteract the expansion of the gas within the melt. As the counterpressure is released, the gas bubbles that would conventionally breakthrough the surface are trapped inside, creating a smooth skin. The GCP controls the foaming through surface quality, foam structure, and skin thickness.

The creation of the single-phase solution, in which the SCF is fully dissolved and uniformly dispersed in the molten biopolymer, takes place inside the injection barrel under carefully controlled process conditions: The SCF must be accurately mass flow metered into the biopolymer for a fixed amount of time. And during the dosing period, the right conditions of temperature, pressure and shear may be established within the barrel. Back-pressure, screw-speed and barrel-temperature control, as well as the SCF delivery system all play a role in establishing the process conditions that create the single-phase solution.

Once the single-phase solution has been created, a modified injection molding machine maintains the solution in a pressurized state until the start of injection. The machine achieves this through the combined efforts of a shutoff nozzle and screw position control. The shutoff nozzle prevents depressurization and premature foaming into the mold. Either active or passive screw position control prevents depressurization through the backward movement of the screw. During active screw position control, the position of the screw is continuously monitored, and the pressure applied to the back of the screw is adjusted to maintain a position setpoint or a constant pressure is held on the back of the screw. In passive position control, the oil used to regulate back pressure is prevented from draining to its tank at the end of screw recovery. This residual oil keeps the screw from moving backward due to the pressure of the single-phase solution.

Proper mold design also helps maintain the single-phase solution. Molds with a hot runner system require valve gates to prevent material dribbling from the nozzles upon mold open. Molds in which the machine nozzle breaks contact with the sprue bushing during normal operation, such as with stack or tandem molds, require a shutoff on the sprue bushing. Otherwise, the pressure from the hot runner will be relieved through the sprue bushing.

The foaming agent utilized for injection molding the biodegradable and industrially compostable microcellular foams is either inert nitrogen gas or carbon dioxide in a SCF state. Each of the aforementioned foaming agents has its place, depending on the technical requirements of the final part being produced.

A useful foaming agent for this invention is SCF nitrogen gas as it provides improved weight reduction and a fine cell structure at much lower weight percentages than SCF carbon dioxide. In fact, SCF nitrogen levels will typically be at least 75 percent lower than the SCF carbon dioxide level required to achieve comparable parts. SCF carbon dioxide, however, is the preferred foaming agent in two situations: when viscosity reduction is the primary processing goal or when the application can't tolerate SCF nitrogen's more aggressive foaming action.

Differences in the effectiveness of two foaming agents stem from their behavior in the biopolymer melt. Carbon dioxide, which becomes an SCF fluid at 31.1 Celsius and 72.2 bar, is 4 to 5 times more soluble in biopolymers than nitrogen, which becomes a supercritical fluid at −147 Celsius and 34 bar. For example, the saturation point in an unfilled biopolymer is about 1.5 to 2 percent by weight of nitrogen, depending on temperature and pressure conditions, while the saturation level of carbon dioxide is closer to 8 percent by weight. Carbon dioxide also exhibits a greater mobility in the biopolymer, allowing it to migrate further into existing bubbles than nitrogen. From the perspective of cell nucleation, greater solubility and mobility means fewer cells will be nucleated, and those that do nucleate will tend to be larger.

Solubility, however, becomes an advantage when the goal is viscosity reduction. An SCF dissolved in a biopolymer acts as a plasticizing agent, reducing the viscosity of the biopolymer. Because viscosity reduction is partly a function of the amount of SCF added to the biopolymer and because carbon dioxide has a higher solubility limit than nitrogen, the ability to reduce viscosity with carbon dioxide is greater.

Carbon dioxide is also preferred when the amount of nitrogen needed to produce a part is so low that it is not possible to consistently process parts. Since carbon dioxide is a much less aggressive foaming agent, there are times where it is easier to run low levels of carbon dioxide. For example, 0.15 or 0.2 percent carbon dioxide as compared to very low levels of nitrogen at less than 0.05 percent. Instances as indicated in the previous example occur primarily with soft materials and parts with thick cross sections.

Although a few embodiments have been described in detail above, other modifications are possible. Other embodiments may be within the scope of the following claims.

The invention claimed is:

1. A method for manufacturing a foam product, the method comprising:
   forming a molten polymer from a thermoplastic masterbatch, the thermoplastic masterbatch comprising one or more biodegradable thermoplastic polymers;
   mixing a supercritical fluid with the molten polymer to create a single-phase solution;
   introducing the single-phase solution into a mold cavity of a molding apparatus that is pressurized with a counterpressure gas, wherein the molding apparatus includes a control unit that dynamically applies varying pressures to the mold cavity with the counterpressure gas; and
   foaming the single-phase solution in the mold cavity by allowing the supercritical fluid to come out of solution, thereby forming a foam.

2. The method of claim 1, wherein the one or more biodegradable thermoplastic polymers comprise one or more of polylactic acid, poly(butylene adipate-co-terephthalate), polycaprolactone, polyhydroxy alkanoate, polybutylene succinate, polybutylene succinate adipate, polybutylene adipate, or combinations thereof.

3. The method of claim 1, wherein the one or more biodegradable thermoplastic polymers are selected from the group consisting of polylactic acid, poly(butylene adipate-co-terephthalate), polycaprolactone, polyhydroxy alkanoate, polybutylene succinate, polybutylene succinate adipate, polybutylene adipate, and combinations thereof.

4. A method for manufacturing a foam product, the method comprising:
   forming a molten polymer from a thermoplastic masterbatch, the thermoplastic masterbatch comprising one or more biodegradable thermoplastic polymers, wherein the one or more biodegradable thermoplastic polymers comprises poly(butylene adipate-co-terephthalate);
   mixing a supercritical fluid with the molten polymer to create a single-phase solution;
   introducing the single-phase solution into a mold cavity of a molding apparatus that is pressurized with a counterpressure gas, wherein the molding apparatus includes a control unit that dynamically applies varying pressures to the mold cavity with the counterpressure gas; and
   foaming the single-phase solution in the mold cavity by allowing the supercritical fluid to come out of solution, thereby forming a foam.

5. The method of claim 1, wherein the thermoplastic masterbatch does not include ethylene vinyl acetate.

6. The method of claim 1, wherein the one or more biodegradable thermoplastic polymers do not cross-link during manufacturing of the foam product.

7. The method of claim 1, wherein the supercritical fluid comprises supercritical nitrogen.

8. The method of claim 1, wherein the supercritical fluid comprises supercritical carbon dioxide.

9. The method of claim 1, wherein the supercritical fluid is introduced into the molten polymer at a pressure in the range of about 150 bar to about 300 bar.

10. The method of claim 1, wherein gas bubbles are prevented from breaking through a surface of the foam by the counterpressure gas during foaming of the single-phase solution.

11. The method of claim 1, wherein the mold cavity is pressurized with the counterpressure gas to a pressure in the range of about 5 bar to about 50 bar.

12. The method of claim 1, wherein the mold cavity is pressurized with the counterpressure gas for a length of time between 1 second to 25 seconds.

13. The method of claim 1, wherein introducing the single-phase solution into the mold cavity comprises contacting a surface of the mold cavity with the single-phase solution.

14. The method of claim 13, further comprising controlling a temperature of the surface of the mold cavity with a dynamic mold temperature control system that is configured to provide hot and cold thermal cycling.

15. The method of claim 14, wherein the dynamic mold temperature control system comprises one or more heating elements and one or more cooling elements coupled to the mold cavity.

16. A method for manufacturing a foam product, the method comprising:
   forming a molten polymer from a thermoplastic masterbatch, the thermoplastic masterbatch comprising one or more biodegradable thermoplastic polymers;
   mixing a supercritical fluid with the molten polymer to create a single-phase solution;
   introducing the single-phase solution into a mold cavity of a molding apparatus that is pressurized with a counterpressure gas, wherein the molding apparatus includes a control unit that dynamically applies varying pressures to the mold cavity with the counterpressure gas; and
   foaming the single-phase solution in the mold cavity by allowing the supercritical fluid to come out of solution, thereby forming a foam,
   wherein the foam has a density in a range of about 2 lbs/ft$^3$ to about 10 lbs/ft$^3$.

17. The method of claim 1, wherein the mold cavity has a shape such that the foam is formed in the mold cavity in a shape of a shoe sole, a shoe midsole, or a shoe insole.

18. The method of claim 17, wherein the mold cavity has a shape such that the foam is formed in the mold cavity in a shape of a shoe insole.

19. The method of claim 1, further comprising joining a fabric layer to the foam.

20. The method of claim 1, wherein the foam is entirely biodegradable and/or entirely industrially compostable.

* * * * *